(12) United States Patent
Monta et al.

(10) Patent No.: US 6,532,041 B1
(45) Date of Patent: Mar. 11, 2003

(54) TELEVISION RECEIVER FOR TELETEXT

(75) Inventors: Hiroki Monta, Takatsuki (JP); Tomoe Kawane, Moriguchi (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 08/721,169

(22) Filed: Sep. 26, 1996

(30) Foreign Application Priority Data

Sep. 29, 1995  (JP) ............................................. 7-252545
Oct. 3, 1995  (JP) ............................................. 7-256388
Oct. 3, 1995  (JP) ............................................. 7-256639

(51) Int. Cl.[7] .............................................. H04N 7/087
(52) U.S. Cl. ....................... 348/468; 348/564; 348/600; 348/586
(58) Field of Search ............................. ; 348/468, 589, 348/597, 584, 598, 585, 599, 586, 600, 564, 562; 358/147, 142; H04N 5/445, 5/44, 7/08, 7/087, 9/74

(56) References Cited

U.S. PATENT DOCUMENTS 5,170,256 A   12/1992  Tabata
5,177,612 A  * 1/1993  Nakamura et al.

FOREIGN PATENT DOCUMENTS

| EP | 0 486 129 | 5/1992 | | |
|----|-----------|--------|---|---|
| EP | 0 497 235 | 8/1992 | | |
| EP | 0 553 910 | 8/1993 | | |
| GB | 2 165 719 | 4/1986 | | |
| GB | 2242594 | * 10/1991 | .......... | H04N/5/445 |
| JP | 63-167591 | * 7/1988 | ............ | H04N/9/74 |
| WO | 95/01051 | 1/1995 | | |

OTHER PUBLICATIONS

Darrington, Philip "Wireless World Teletext deoder (1—The background)", Wireless World, Nov. 1975, pp. 498–504.*
European Search Report for Int'l Appln. No. 96306982 dated Sep. 30, 1998.

* cited by examiner

Primary Examiner—David E. Harvey
(74) Attorney, Agent, or Firm—RatnerPrestia

(57) ABSTRACT

The present invention relates to a television receiver for teletext for receiving a composite video signal having text information multiplex on a television video signal, and more particularly to a television receiver for teletext capable of displaying the television video signal and teletext screen simultaneously on the picture screen by superimposing or dividing the screen, and according to this television receiver for teletext, which comprises preprocessing means for issuing various preprocessing correction signals on the basis of the teletext signal extracted by the teletext signal receiving means, the preprocessing correction signal issued by the preprocessing means, and the teletext signal received by the teletext signal receiving means are combined and displayed on the picture screen, and thereby the boundary of the television video signal and teletext signal is clearer, so that the text of thetelet ext signal is easier to read.

2 Claims, 29 Drawing Sheets

Television video signal

Teletext video signal

YS signal

Composite video signal

Teletext video signal

Composite control signal
(YS signal)

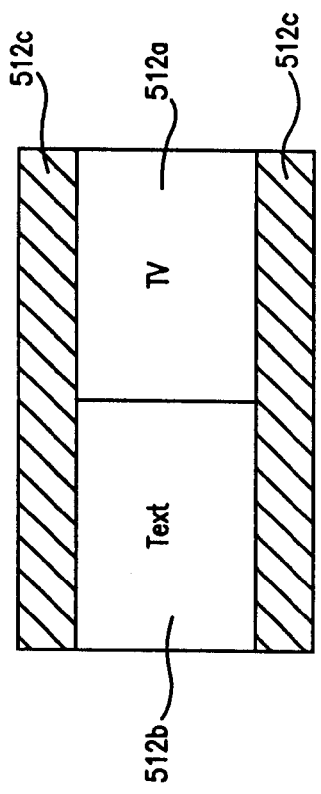
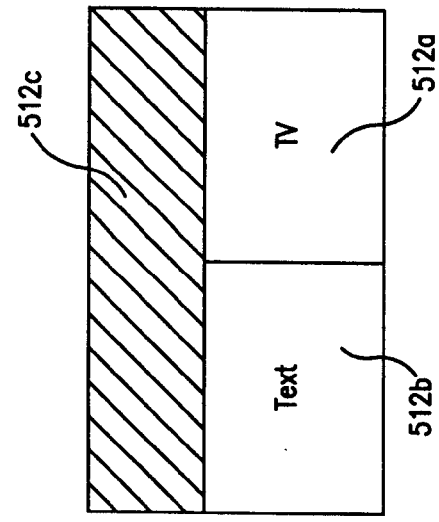
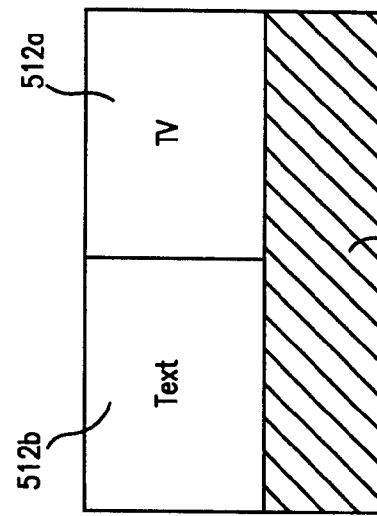
FIG. 6(a) PRIOR ART
FIG. 6(b) PRIOR ART
FIG. 6(c) PRIOR ART Television video signal Teletext video signal YS signal YS signal magnified in time width Composite video signal

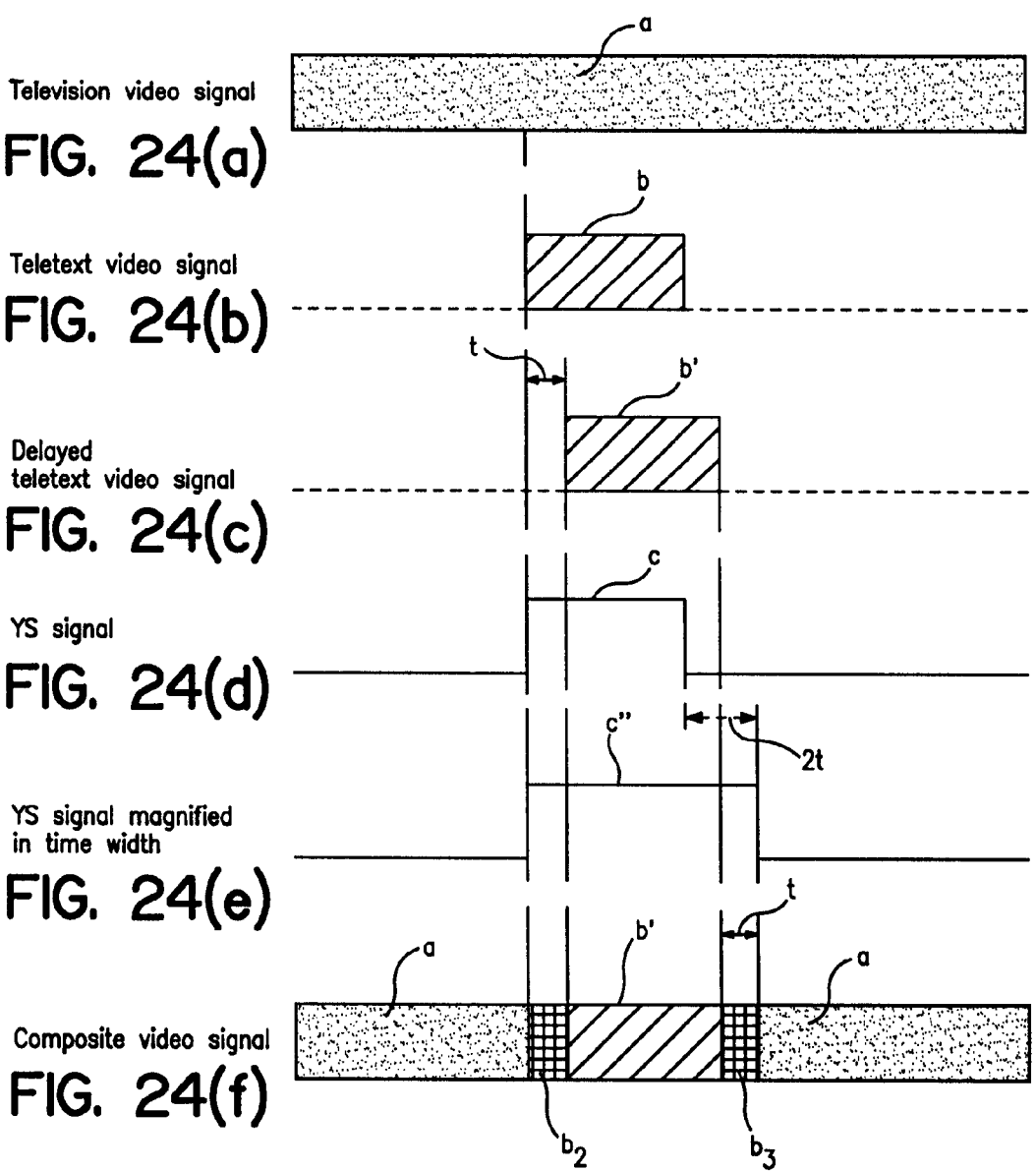
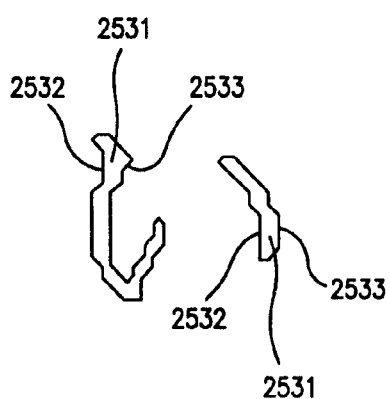
FIG. 25

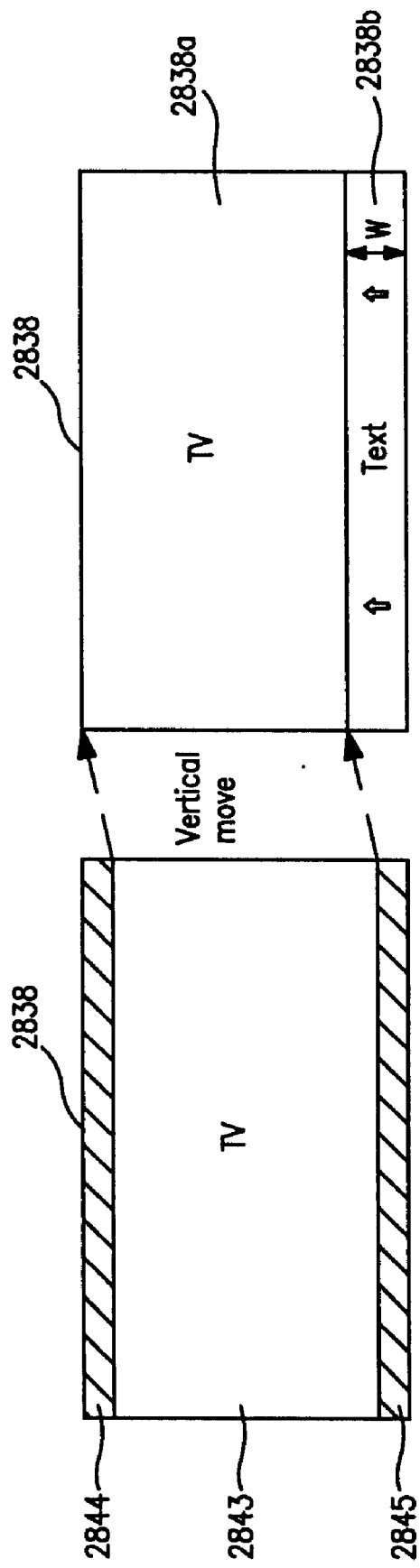

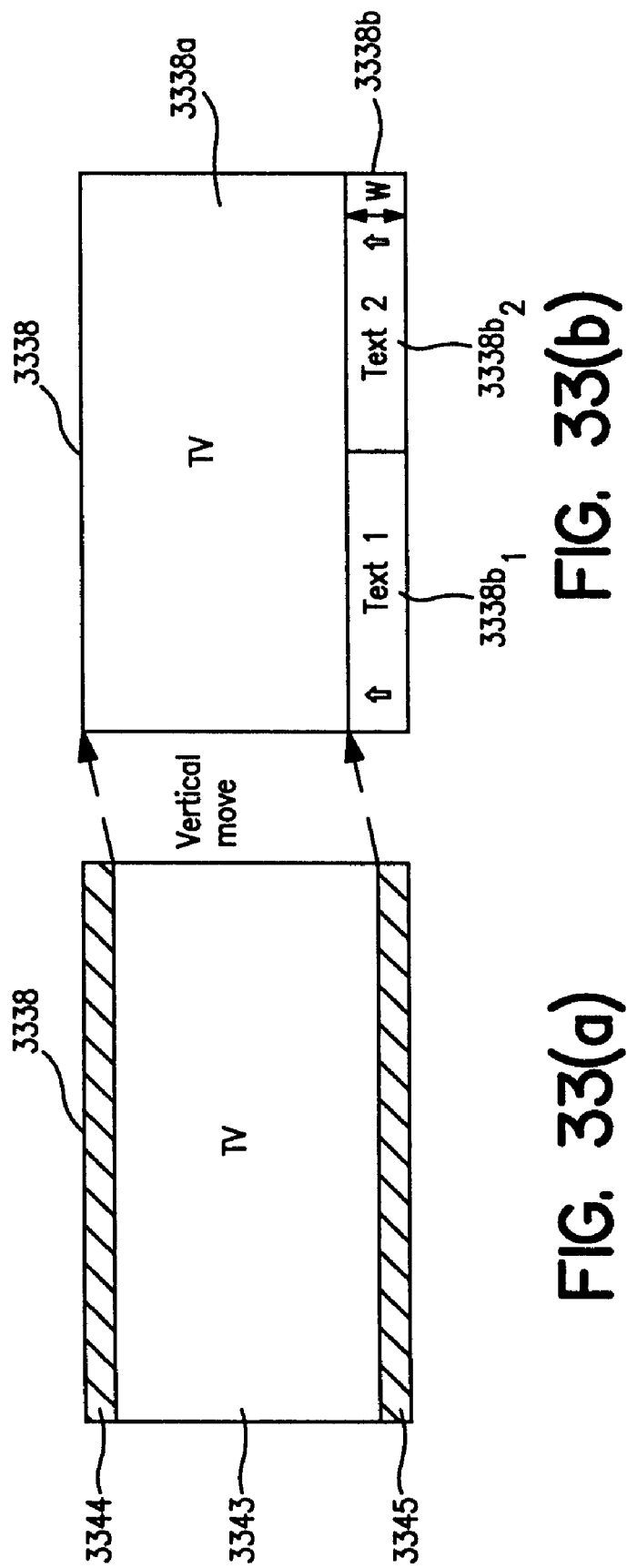

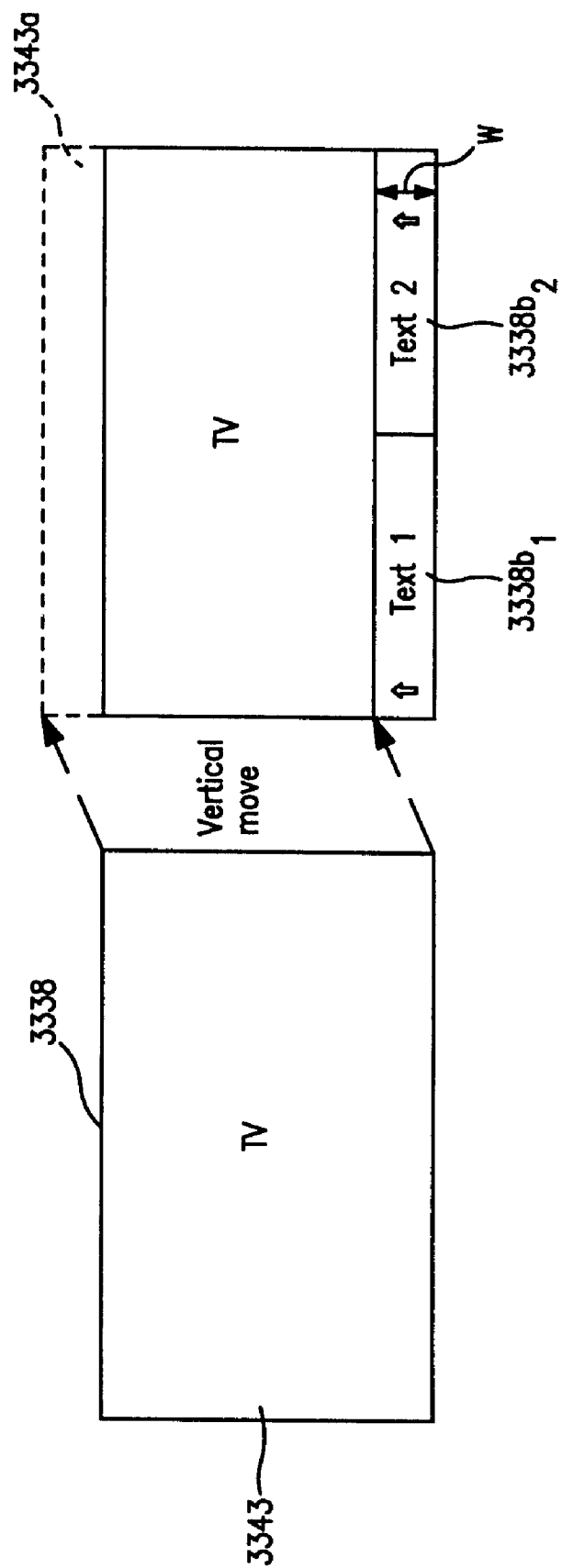

TELEVISION RECEIVER FOR TELETEXT

BACKGROUND OF THE INVENTION

The present invention relates to a television receiver for teletext for receiving a composite video signal having text information multiplexed on a television signal, and more particularly to a television receiver for teletext for displaying television video signal and teletext signal simultaneously on a picture screen by superimposing or dividing the screen.

Further particularly it relates to a television receiver for teletext for displaying a television video signal and teletext signal simultaneously on a screen of aspect ratio of 16:9 known as wide television.

FIG. 1 shows a schematic constitution of a television receiver for teletext of a prior art. In the diagram, reference numeral 11 is an input signal of demodulated composite video signal, 12 is a television video signal processing circuit for receiving a composite video signal and converting into a television signal a (signal of three primaries R, G, B), 13 is a teletext signal receiving circuit for extracting a teletext signal superposed in a vertical blanking period of input composite video signal to convert into teletext video signal b (signal of three primaries R, G, B), and generating a composite control signal (YS signal ) c synchronized with the teletext video signal b, 14 is a synthesizing circuit for superimposing a teletext video signal b from the teletext signal receiving circuit 13 for the television video signal a from the television video signal processing circuit 12 on the basis of the composite control signal (YS signal) c from the teletext signal receiving circuit 13, and 15 is a display device such as CRT and LCD for displaying the composite video signal d.

The operation is described below. FIG. 2(a) shows a television video signal a in part of one horizontal line, and FIG. 2(b) shows a teletext video signal b in part of one horizontal line. FIG. 2(c) shows a composite control signal (YS signal) c generated completely at same timing (in same time width) synchronously with the teletext video signal b.

The teletext video signal b, for example, at the timing of horizontal line 16 of letter "l" in FIG. 3(a), produces two waveforms as shown in FIG. 3(b). and the composite control signal (YS signal) c is generated at the same timing as the teletext video signal b as shown in FIG. 3(c).

FIG. 2(d) shows the composite video signal d having the television video signal a and teletext video signal b synthesized according to the composite control signal (YS signal) c. In the composite video signal d, the television video signal a is extracted at the timing of teletext video signal b.

FIG. 4 shows the detail of the teletext signal receiving circuit 13 in the television receiver for teletext. In this diagram, reference numeral 31 is a teletext signal decoder for extracting and decoding the teletext signal superposed in the vertical blanking period from the input composite video signal, 61 is a memory for storing decoded teletext data, 62 is a memory control circuit for controlling writing and reading of the memory 61, 35 is a line memory for storing the teletext data for the portion of one horizontal line temporarily, 42 is a look-up table for converting the teletext data read out from the line memory 35 into color data of R, G, B, and 37 is a D/A converting circuit for converting the developed color data into analog video signal. Reference numeral 43 is an opaque color control signal generating circuit for receiving bit map data from the line memory 35, generating YM signal (opaque color control signal), and issuing into a video chroma signal processing circuit 23, and 44 is a changeover signal generating circuit of teletext signal/video chroma signal for receiving bit map data, generating YS signal (changeover signal of teletext signal/ video chroma signal), and issuing into a switch 26. By changing over the switch by the YS signal, both video chroma signal and teletext signal are displayed simultaneously on the picture screen. In the case of superimposed broadcast of YM signal, the background of the script is opaque, and in the case of teletext, not superimposed broadcast, the text is displayed and accompanied by foreground color and background color.

Furthermore, FIG. 5 shows a constitution of a television receiver for teletext for explaining the prior art especially from the aspect of synchronizing signal. In this diagram, reference numeral 501 is an antenna, and 502 is a receiving circuit for receiving television broadcast wave and extracting a composite video signal of base band. The composite video signal from the receiving circuit 502 is supplied simultaneously also to a video chroma signal processing circuit 503, a teletext signal receiving circuit 504, and a synchronism separating circuit 505. The video chroma signal processing circuit 503 is a circuit for demodulating the composite video signal, and extracting color signals of three primaries R, G, B, and the teletext signal receiving circuit 504 is a circuit for extracting the teletext signal superposed on the composite video signal, and converting into color signals of three primaries R, G, B. Reference numeral 506 is a double speed converting circuit for compressing the image of R, G, B signals from the video chroma signal processing circuit 503 by ½ in the horizontal direction, and 507 is a double speed converting circuit for compressing the image of R, G. B signals from the teletext signal receiving circuit 504 by ½ in the horizontal direction. These double speed converting circuits 506, 507 are individually composed of three A/D converters for converting R. G, B signals into digital data, three line memories for storing the converted data and reading out at double speed of writing speed, and three D/A converters for converting the read data into analog R, G, B signals. Reference numeral 510 is a changeover circuit having a switch 508 and a switch 509. The switch 508 is for changing over the signal from the double speed converting circuit 506 and the signal from the double speed converting circuit 507 at high speed in order to display the television video signal and teletext signal simultaneously, and the switch 509 is for selectively changing over the signal from the video chroma signal processing circuit 503, the signal from the teletext signal receiving circuit 504 and the signal from the switch 508. Reference numeral 511 is a picture tube drive circuit, and 512 is a picture tube.

The switches 508, 509 in the changeover circuit 510 are designed to be changed over by a control signal from a controller 513. The horizontal synchronizing signal and vertical synchronizing signal separated in the synchronism separating circuit 505 are respectively supplied into a horizontal deflection circuit 514 and a vertical deflection circuit 515.

The signal generated by the double speed converting circuits 506, 507 are compressed by ½ in the horizontal direction. On a wide screen of the picture tube 512, when displaying both television video signal and teletext signal simultaneously, generally, the aspect ratio is 4:3 in both signals (see FIG. 6). Accordingly, in both signals, the screen must be compressed also in the vertical direction, and a vertical amplitude changeover circuit 516 and a vertical screen position control circuit 517 are provided, and their outputs are supplied into the vertical deflection circuit 515.

The vertical amplitude changeover circuit 516 and vertical screen position control circuit 517 are designed to be controlled by the controller 513. The vertical amplitude changeover circuit 516 reduces the amplitude of the sawtooth wave supplied to the vertical deflection circuit 515. The vertical screen position control circuit 517 adds a direct-current voltage to the sawtooth wave reduced in amplitude, and the timing of the sawtooth wave is adjusted in the vertical direction.

As a result, as shown in FIG. 6, on the wide screen of the picture tube 512, a screen 512a of television video signal, and a screen 512b of teletext signal, both of aspect ratio 4:3, are displayed. At this time, the double speed converting circuits 506, 507 are changed over to high speed by the switch 508. Reference numeral 512c is a no-picture area without display. When the vertical positions of the both screens 512a, 512b are fixed, deterioration of phosphor in these portions is promoted, and the screen luminance is uneven in the case of full screen display. Accordingly, the vertical screen position control circuit 517 is operated and the vertical positions of the both screens 512a, 512b are changed appropriately as shown in FIG. 6(a) to (c).

Thus, in the prior art, if attempted to display the television video signal and teletext signal simultaneously on a same screen by overlapping, the composite control signal (YS signal) c is generated at the same timing and same time width as the teletext video signal b, and the television video signal a and teletext video signal b are synthesized by such composite control signal (YS signal) c, and therefore the boundary is not clear between each character of the teletext picture displayed in the display device 15 and the television picture in the immediate vicinity, and in particular when the luminance levels of the two are very close, it is hard to read the superimposed text.

Yet, the text is always accompanied by foreground color and background color, and the foreground color and background color change variously, and hence the displayed text itself is hard to see.

Further, on the wide screen with aspect ratio of 16:9, if attempted to display the television video signal and teletext signal simultaneously on the same screen by dividing the screen, the screen 512a of television video signal and screen 512b of teletext signal of aspect ratio 4:3 displayed by compressing in the horizontal direction and vertical direction are smaller than the full screen, and the no-picture area 512c is wide, and the full screen (wide screen) is not utilized effectively.

SUMMARY OF THE INVENTION

It is hence an object of the invention to display teletext signal more explicitly even when displaying the teletext signal on the picture screen together with television video signal, simultaneously by superimposing or by dividing the screen.

To achieve the object, the invention provides a television receiver for teletext comprising video signal receiving means for receiving a video signal superposing a teletext signal, teletext signal receiving means for extracting the superposed teletext signal from the composite video signal received by the video signal receiving means, preprocessing means for issuing a preprocessing correction signal on the basis of the teletext signal extracted from the teletext signal receiving means, synthesizing means for synthesizing the video signal received by the video signal receiving means, preprocessing correction signal issued from the preprocessing means, and teletext signal received by the teletext signal receiving means, and display means for displaying the output of the synthesizing means on a picture screen, wherein the boundary of the television video signal and teletext signal is more clear, and the text of the teletext signal is easy to read.

In particular, the preprocessing means generates a foreground color and a background color by the teletext data, decoded by the teletext signal receiving means, and issues a preprocessing correction signal for decreasing the luminance of the surrounding background color as compared with the text foreground color in the display region of the teletext signal of the picture screen, and the synthesizing means synthesizes.so as to display the video signal from the video signal receiving means in the background of the preprocessing correction signal, so that the boundary of the television video signal and teletext signal is clearer, and it is easier to read the text of the teletext signal.

Moreover, the preprocessing means generates the teletext data decoded by the teletext signal receiving means delayed or advanced by specific time in the horizontal scanning direction to obtain teletext data with phase deviation, and issues a preprocessing correction signal to be low luminance level signal for a specific time between the teletext data and teletext data with phase deviation, and the synthesizing means synthesizes to display by reducing the luminance before or after the text, in the display region of the teletext signal on the picture screen, and therefore the boundary of the television video signal and teletext signal is clearer, and it is easier to read the text of the teletext signal.

Still more, the preprocessing means displays the teletext data decoded by the teletext signal receiving means, either above or beneath the region of display of video signal by the video signal receiving means on the picture screen, and also issues a preprocessing correction signal for controlling so as to be displayed in the vertical scroll state, and the synthesizing means synthesizes the video signal and teletext data so as not to form a no-picture area on the picture screen, so that the television video signal and teletext signal can be displayed effectively on the screen by separating.

BRIEF DESCRIPTION OF THE DRAWINGS

FIG. 6 is a diagram showing state of divided display of two screens with aspect ratio of 4:3 on a wide screen of prior art.
(a) Screen middle display
(b) Screen top display
(c) Screen bottom display

(a) Television video signal
(b) Text multiplex video signal
(c) YS signal
(d) YS signal magnified in time width
(e) Composite video signal

FIG. 24 is a timing chart for explaining the operation of the seventh embodiment.

(a) Television video signal
(b) Text multiplex video signal
(c) Delayed teletext video signal
(d) YS signal
(e) YS signal magnified in time width
(f) Composite video signal FIG. 25 is a diagram showing display state of one letter in the displayed superimposed text in the seventh embodiment.

FIG. 30(a) is a diagram showing middle display of television signal only, and (b) display of two screens in a vertical scroll display state of teletext signal in the tenth embodiment.

FIG. 31(a) is a diagram showing display of television signal only, and (b) display of two screens in a vertical scroll display state of teletext signal in the tenth embodiment.

FIG. 33(a) is a diagram showing middle display of television signal only, and (b) display of three screens in a vertical scroll display state of teletext signal in the eleventh embodiment.

FIG. 34(a) is a diagram showing display of television signal only, and (b) display of three screens in a vertical scroll display state of teletext signal in the eleventh embodiment.

DESCRIPTION OF THE PREFERRED EMBODIMENTS

Figure 1:
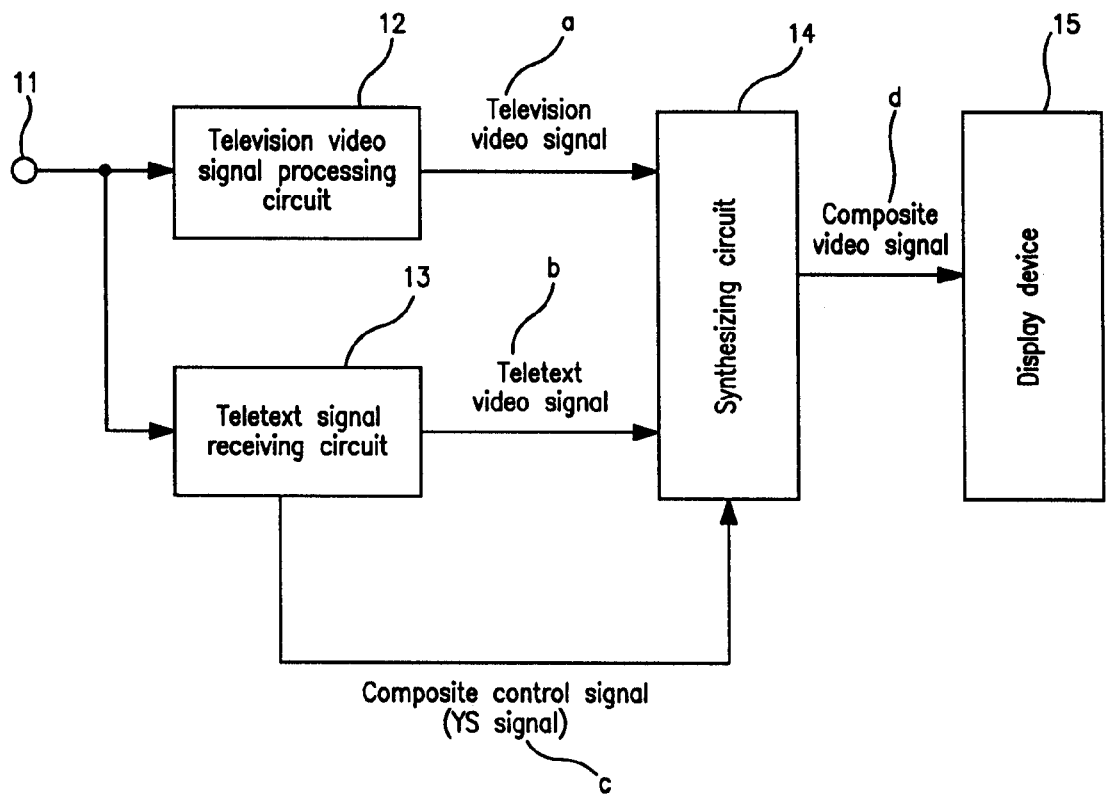
FIG. 1 is a block diagram showing a constitution of a television receiver for teletext of prior art.
Figure 2A:
FIG. 2 is a timing chart for explaining operation of the prior art.
(a) Television video signal
(b) Text multiplex video signal
(c) YS signal
(d) Composite video signal
Figure 2B:
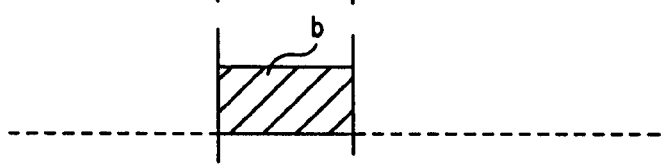
Figure 2C:
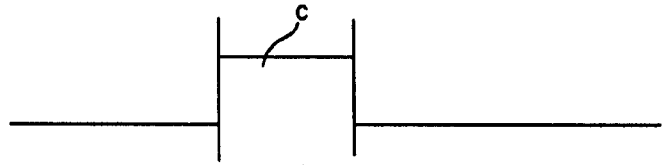
Figure 2D:
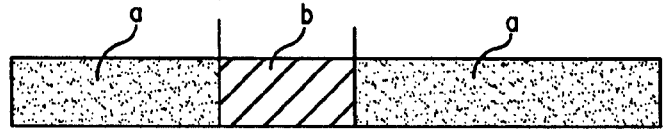
Figures 3A, 3B, 3C:
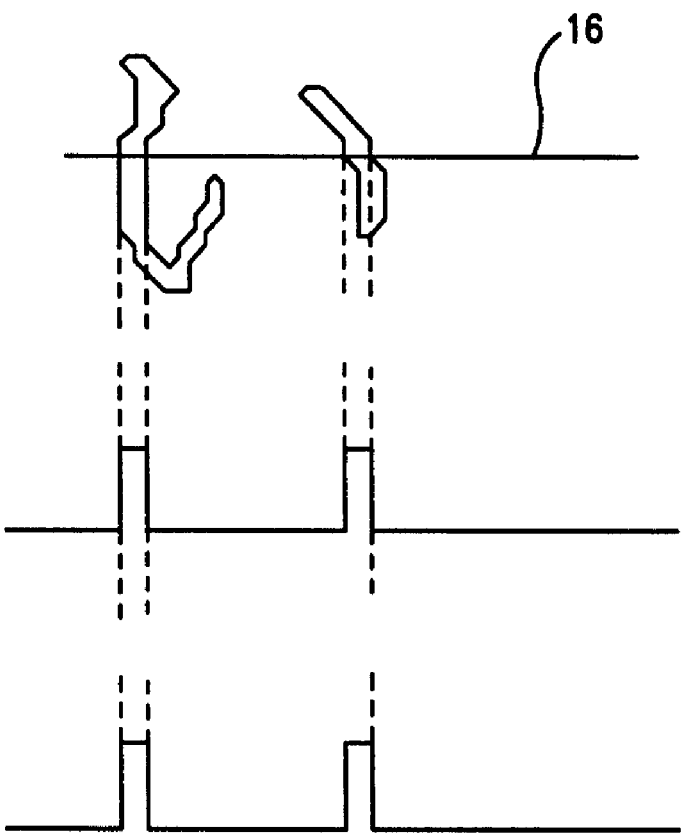
FIG. 3 is a timing chart showing generation of composite control signal of prior art.
(a) Display image of letter "l"
(b) Text multiplex video signal
(c) Composite control signal (YS signal)
Figure 4:
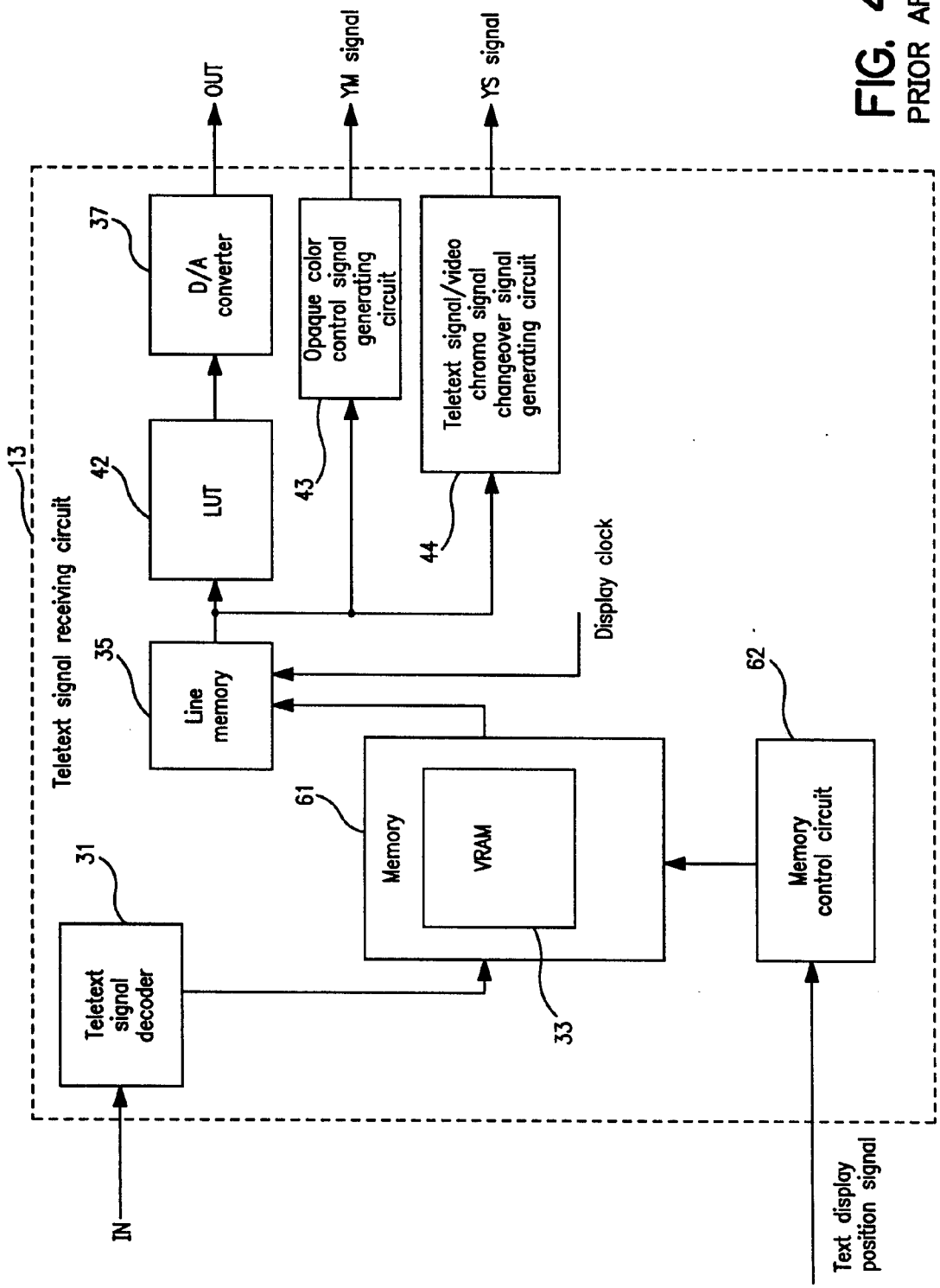
FIG. 4 is a block diagram showing an internal constitution of a color data conversion circuit in prior art.
Figure 5:
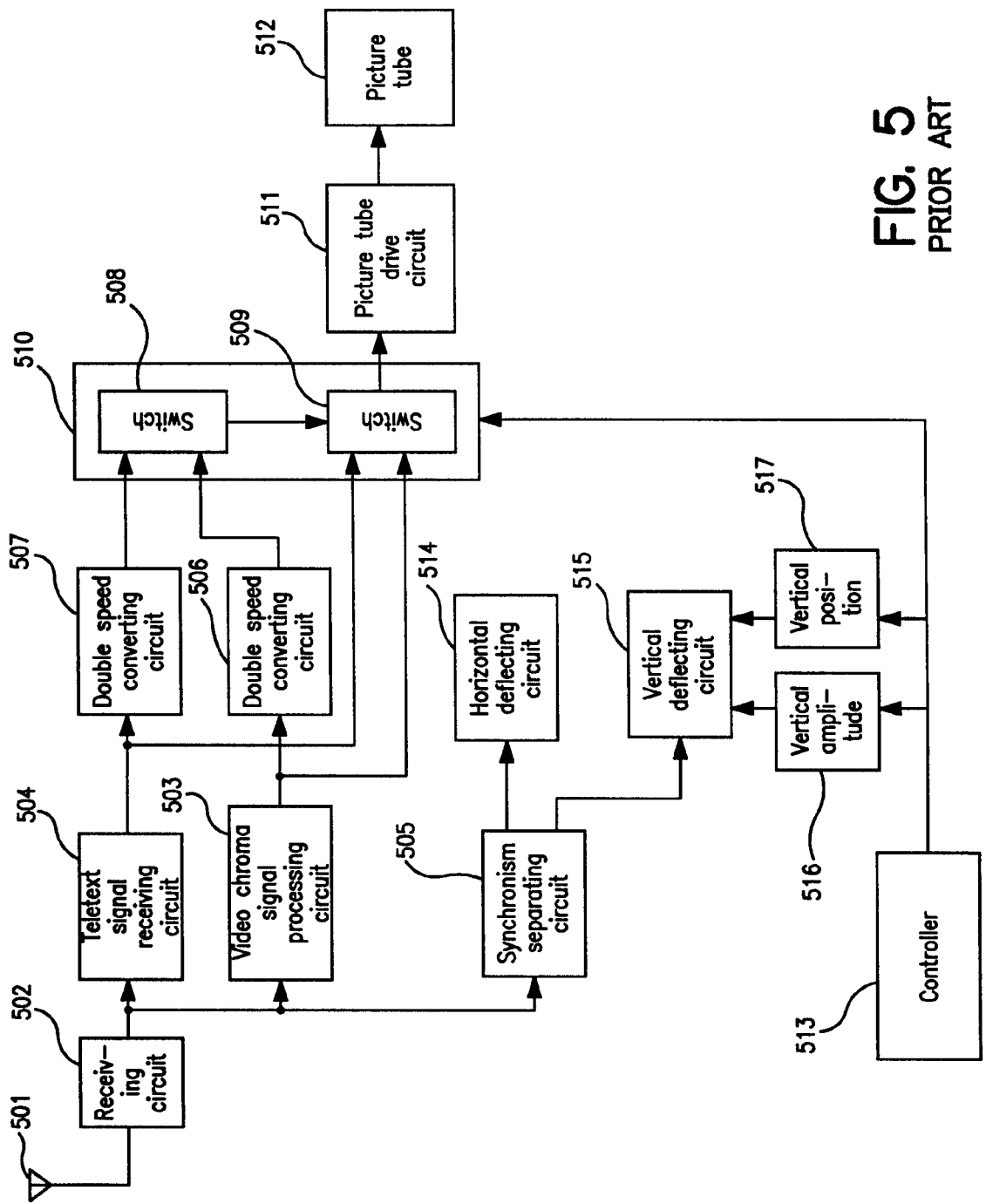
FIG. 5 is a block diagram showing a constitution of television receiver for teletext of prior art.

Referring now to the drawings, referred embodiments of the television receiver for teletext of the invention are described in detail below.

Embodiment 1

Figure 7:
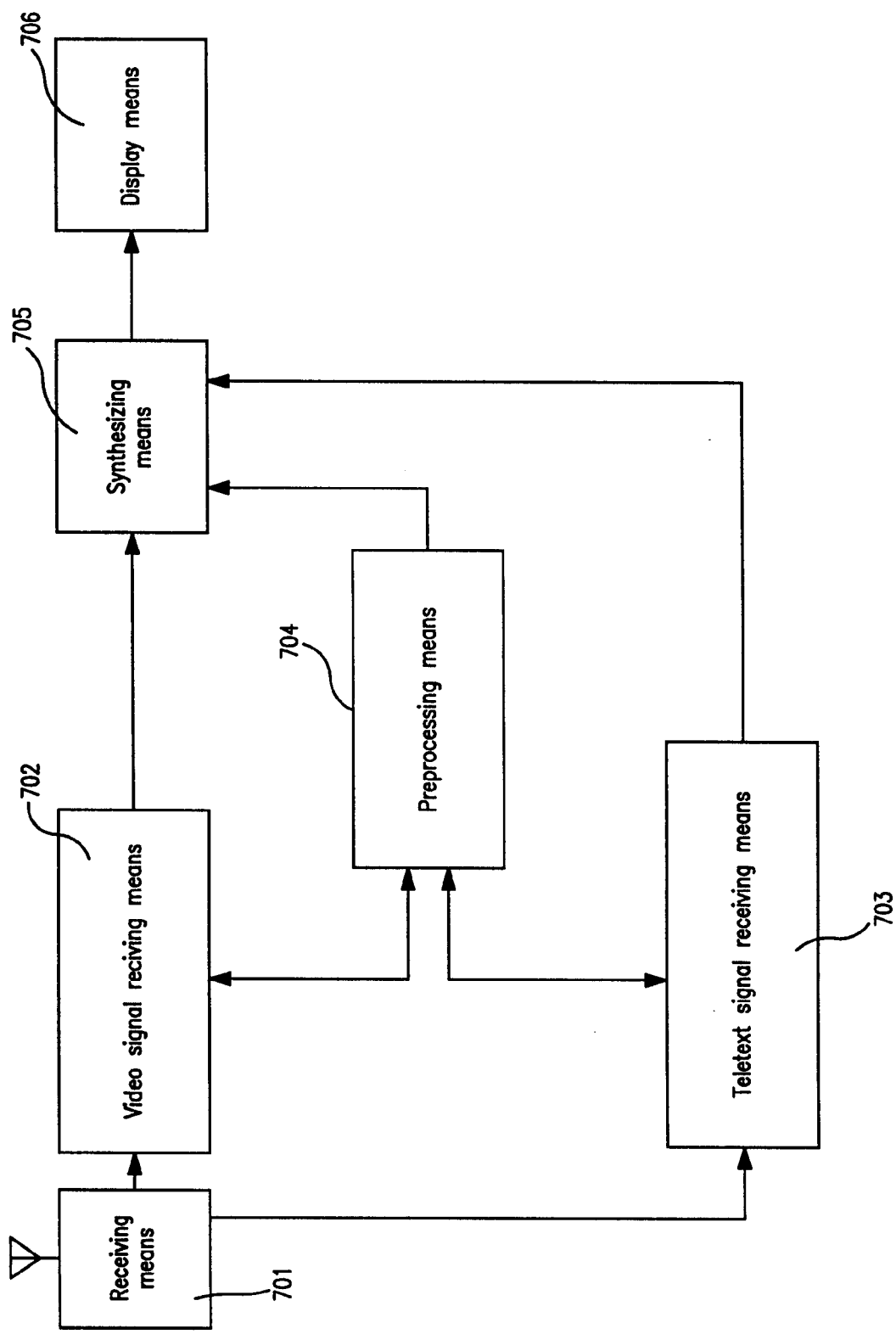
FIG. 7 is a block diagram showing a constitution of television receiver for teletext according to a first embodiment of the invention.

FIG. 7 is a block diagram showing a constitution of a television receiver for teletext according to a first embodiment of the invention.

A composite video signal multiplexing a teletext signal on a television video signal is received by receiving means 701 through an antenna, and is supplied into video signal receiving means 702 and teletext signal receiving means 703.

In the video signal receiving means 702, general video signal processing is done such as demodulation and synchronism separation of television video signal, and its output is issued to synthesizing means 705, while related information, such as the boundary condition differing whether in the mode of displaying the multiplexed text signal and television video signal on a same screen by super-imposing, or in the mode of displaying by dividing the screen, is extracted and issued to preprocessing means 704.

In the teletext signal receiving means 703, the multiplexed text information is decoded, and the video signal of the text information is issued to the synthesizing means 705, while the control signal contained in the teletext signal is issued to the preprocessing means 704.

In the preprocessing means 704, in the case of superimposed mode, extracting the teletext data decoded by the teletext signal receiving means 703, and boundary conditions such as luminance difference and color difference from the surrounding background, it is preprocessed so that the boundary correction signal for clarifying the boundary may be issued.

The output of the preprocessing means 704, television video signal demodulated by the video signal receiving means 702, and character information decoded by the teletext signal receiving means 703 are synthesized in the synthesizing means 705, and send out to display means 706.

In the display means 706, according to the boundary correction signal from the preprocessing means, the boundary of the television video signal and teletext signal is more clarified, and the text of the teletext signal is displayed so as to be read easily.

Moreover, in the case of the mode of displaying the teletext signal by dividing the screen, the preprocessing circuit corrects and outputs so that the video signal and teletext data may be synthesized without forming no-picture area in the picture screen, and the television video signal and text information are synthesized in the synthesizing means 705 so as to be distributed without producing no-picture area. By displaying this output by the display means 706, the screen can be divided to display the television video signal and teletext signal effectively.

Embodiment 2

Figure 8:
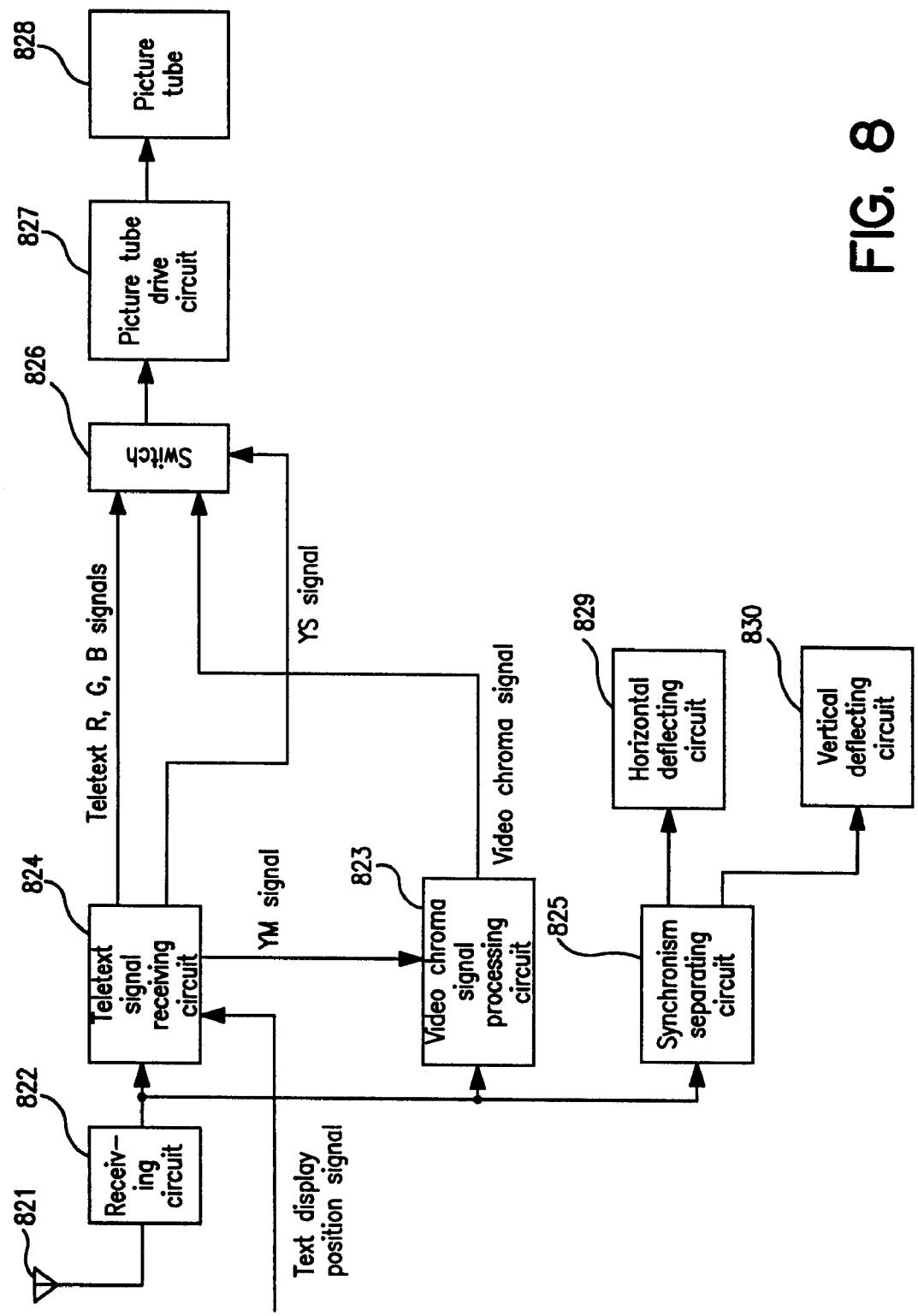
FIG. 8 is a block diagram showing a constitution of television receiver for teletext according to a second embodiment of the invention.

FIG. 8 is a block diagram showing a constitution of a television receiver for teletext according to a second embodiment.

In FIG. 8, reference numeral 821 is an antenna, and 822 is a receiving circuit for receiving a television broadcast wave, and picking up a composite video signal of base band. The composite video signal from the receiving circuit 822 is simultaneously supplied to a video chroma signal processing circuit 823, a teletext signal receiving circuit 824, and a synchronism separating circuit 825. The video chroma signal processing circuit 823 is a circuit for demodulating the composite video signal, and picking up color signals of three primaries R, G, B, and the teletext signal receiving circuit 824 is a circuit for extracting the teletext signal superposed in the vertical blanking period of the composite video signal, and converting into color signals of three primaries R, G, B. Reference numeral 826 is a switch for changing over the signal from the video chroma signal processing circuit 823 and the signal from the teletext signal receiving circuit 824 at high speed, 827 is a picture tube drive circuit, and 828 is a picture tube with aspect ratio of 16:9.

The horizontal synchronizing signal and vertical synchronizing signal separated in the synchronism separating circuit 825 are respectively supplied into a horizontal deflecting circuit 829 and a vertical deflecting circuit 830. From the teletext signal receiving circuit 824 to the switch 826, a YS signal (teletext signal/video chroma signal changeover signal, which is described later) for changing over video chroma signal and teletext signal is issued. From the teletext signal receiving circuit 824 to the video chroma signal processing circuit 823, a YM signal (opaque color control signal, which is described later) for making the background color opaque is issued.

Figure 9:
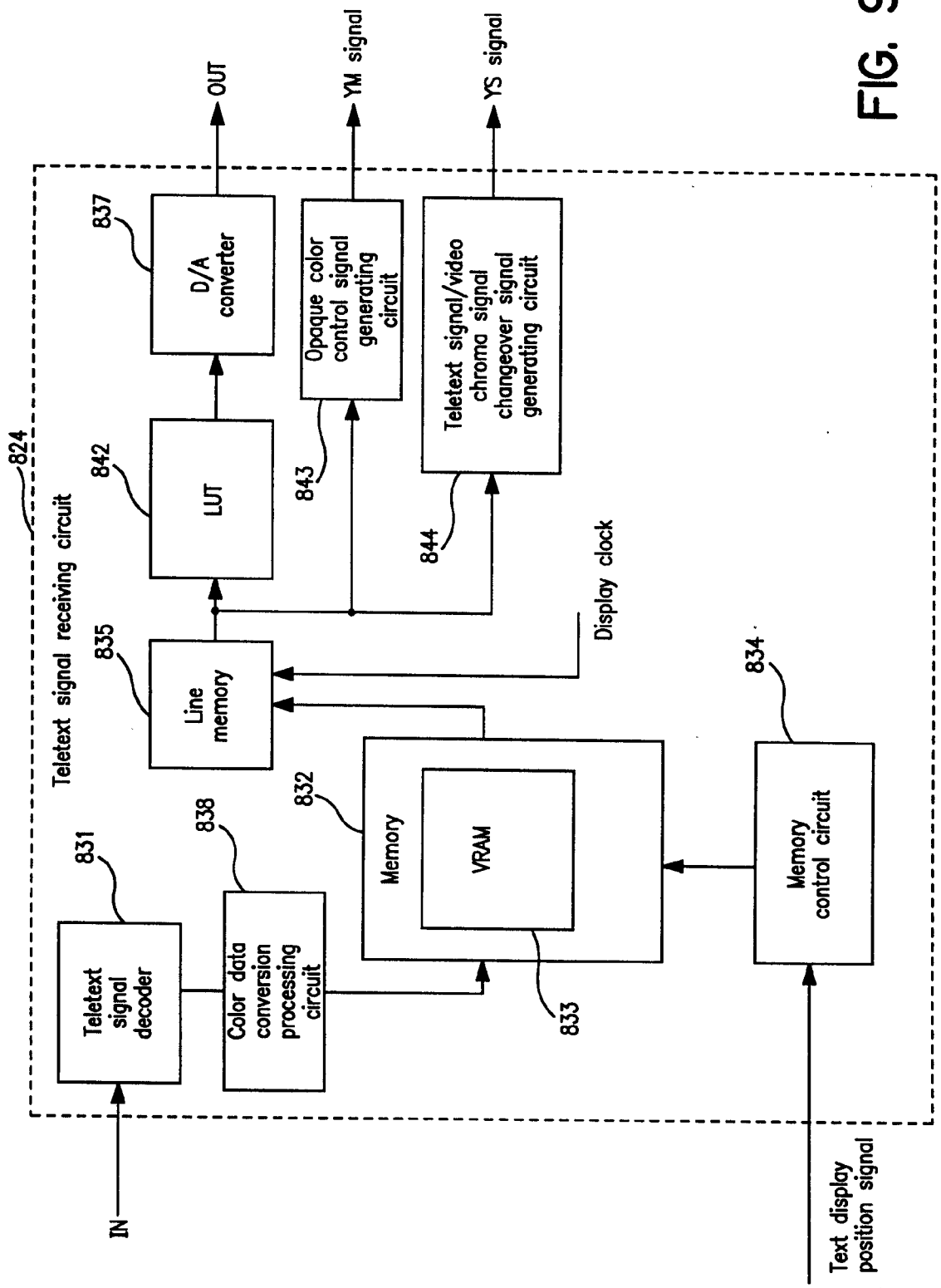
FIG. 9 is a block diagram showing an internal constitution of teletext signal receiving circuit in the second embodiment of the invention.

FIG. 9 is a block diagram showing an internal constitution of the teletext signal receiving circuit 824. In FIG. 9, reference numeral 831 refers to a teletext signal decoder for extracting and decoding the teletext signal superposed in the vertical blanking period from the input composite video signal, 838 is a color data conversion processing unit for processing color data conversion of decoded text data, 832 is a memory for storing the teletext data processed by color data conversion, 833 is a YRAM (video RAM) for writing the data to be displayed which is built up inside the memory 832 in bit map format, 834 is a memory control circuit for controlling writing and reading of the memory 832 and VRAM 833, 835 is a line memory for storing temporarily the teletext data for the portion of one horizontal line, 842 is a lookup table for converting the teletext data being read out from the line memory 835 into color data of R, G, B, and 837 is a D/A conversion circuit for converting the color data of R. G, B of the lookup table into analog video signals.

The memory control circuit 834 reads out the teletext data for specified lines (W lines) in every field from the VRAM 833 on the basis of the text display position signal, and transfers,to the line memory 835, and by sequentially shifting the reading start line in each field when reading out, it is designed to scroll vertically the teletext signal in the lower side region of the wide screen with aspect ratio of 16:9 of the picture tube 812.

The teletext signal receiving circuit 824 generates the YM signal for converting to opaque color and the YS signal for changing over the switch 826, aside from teletext signal analog signals of R, G, B.

The operation is described below. The decoded video signal decoded in the receiving circuit 822 is put into the teletext signal decoder 831 of the teletext signal receiving circuit 824, and the teletext signal is extracted and decoded, and the decoded teletext data is converted into color data in the color data conversion processing circuit 838, and is accumulated in the memory 832, and the data to be displayed among the accumulated teletext data is written into the VRAM 833 in bit map format according to a write control signal from the memory control circuit 834.

Figure 10:
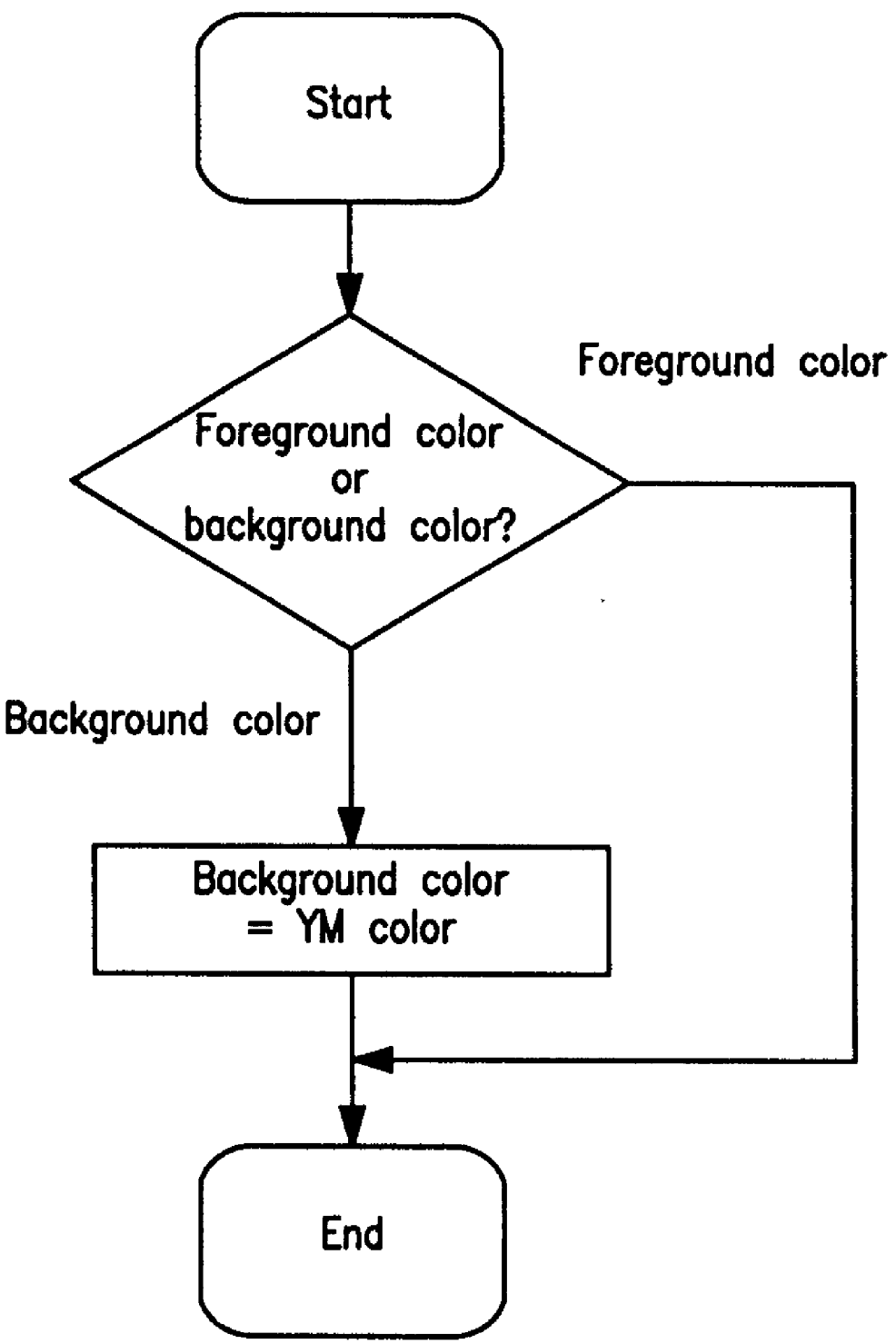
FIG. 10 is a flowchart of color data conversion process of the second embodiment.

The operation of the color data conversion processing circuit 838 is described by referring to FIG. 10. From the decoded teletext data, it is judged if the data is the foreground color or background color, and in the case of foreground color, the decoded data is stored in the memory 832. In the case of background color, the decoded data is converted into opaque color (YM color), and stored in the memory 832.

Figure 11B:
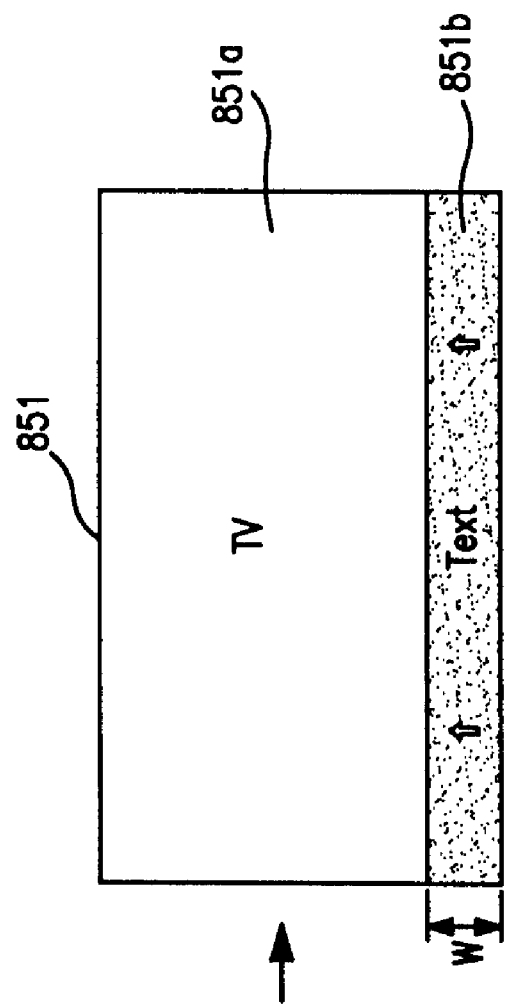
FIG. 11(a) is a diagram showing display of television signal only, and (b) display of two screens in a vertical scroll display state of teletext signal in the second embodiment.
Figure 11A:
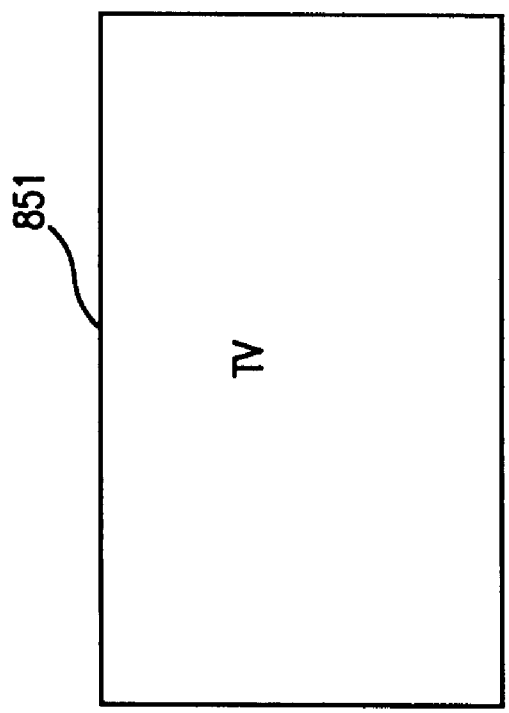

Herein, by the changeover action of the switch 826, as shown in FIG. 11(*a*), it is allowed to obtain the state of displaying only the video chroma signal (TV) in the full screen 851 with aspect ratio of 16:9 on the wide screen of the picture tube 812 as shown in FIG. 11(*a*), and the state of dividing the full screen 851 vertically into an upper screen portion 851*a* of a greater number of lines and a lower screen portion 851*b* with a smaller number of lines (W), as shown in FIG. 11(*b*), to display the video chroma signal in the upper screen portion 851*a*, and display the teletext signal (text) in the lower screen portion 851*b* by scrolling vertically. The upward arrow indicates the state of vertical scrolling.

To realize display of teletext signal while scrolling vertically, the technique for reading out the teletext data from the VRAM 833 is explained below by reference to FIG. 12.

Figure 12:
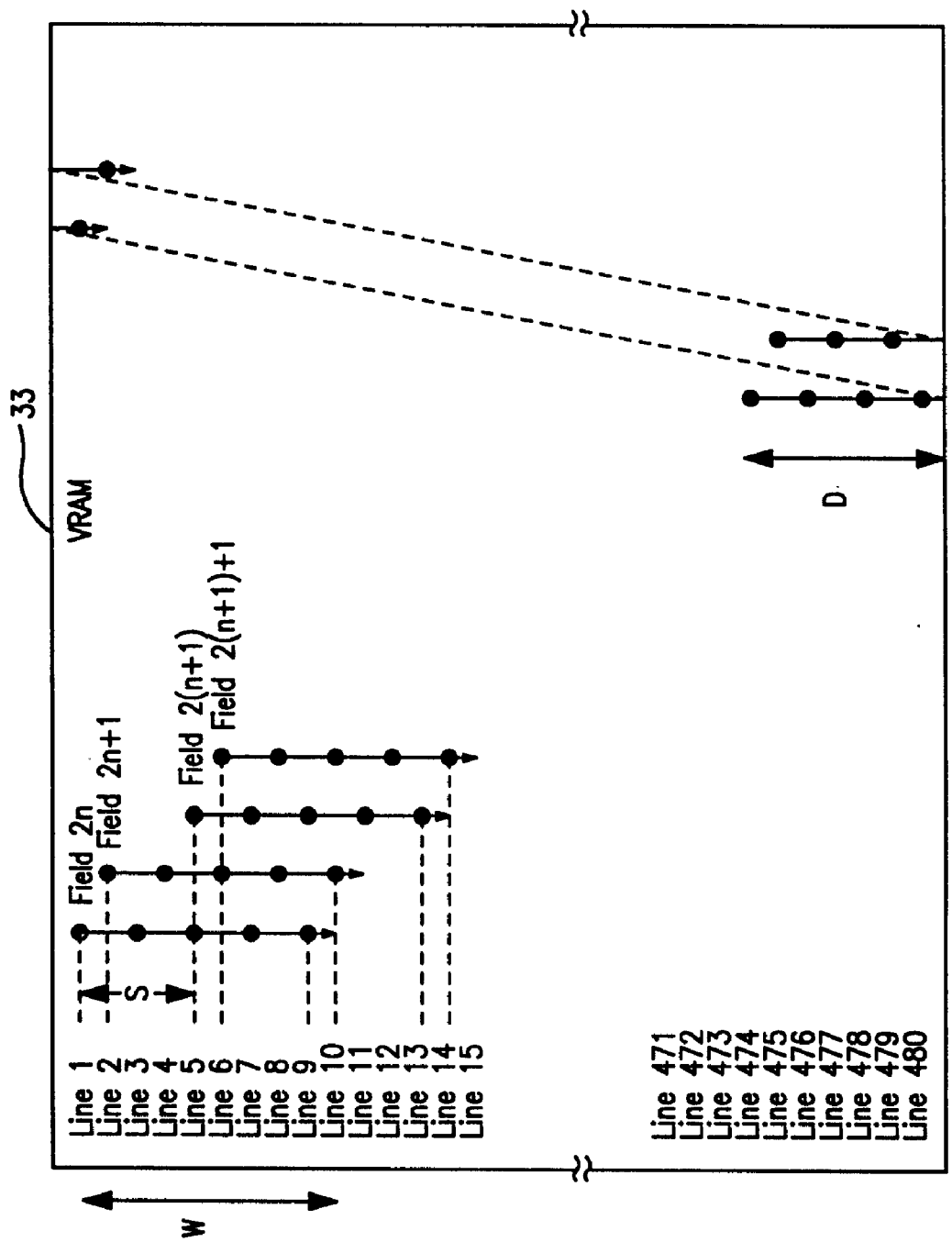
FIG. 12 is a diagram for explaining the technique of reading out teletext data from YRAM for realizing display of teletext signal while scrolling vertically in the upward direction.

FIG. 12 refers to the case of vertical scroll in upward direction. The memory control circuit 834 reads out odd-number lines from the first line of the VRAM 833 for the portion of W lines in field 2*n* (supposing W=10, reading up to line 9), on the basis of the text display position signal. In time series, each line is read out and is sequentially written into the line memory 835.

Consequently, in field 2*n*+1, from the second line, even-number lines are read out for the portion of W lines (up to line 10). As a result, the teletext signals for one frame area displayed in the lower screen portion 851*b*. In succession, in field 2(*n*+1), shifting the read start line by S lines (S=4 in the diagram), odd-number lines are read out from line 5 for the portion of W lines (up to line 13).

Next, in field 2(*n*+1)+1, even-number lines are read out from line 6 for the portion of W lines (up to line 14). As a result, the teletext signals for the next one frame are displayed in the lower screen portion 851*b*. In this stage, from line 1 to line 4 of the VRAM 833 shifting by S lines, the data to be displayed in next cycle is extracted from the teletext data accumulated in the memory 832 and written in to update.

Similarly, thereafter the VRAM 833 is read out up to line 480, and as approaching line 480, the portion of W lines runs short, and in such a case, returning to line 1, the portion of W lines is read out. In this stage, the data is updated from line 1 to line (480-D) of the VRAM 833.

The above operation is more specifically described below. In field 2*n*, lines 1, 3, 5, 7, 9 are read out; in field 2*n*+1, lines 2, 4, 6, 8, 10 are read out; in field 2(*n*+1), lines 5,7, 9, 11, 13 are read out; and in field 2(*n*+1)+1, lines 6, 8, 10, 12, 14 are read out, and in this way the teletext signals are displayed in the lower screen portion 851*b* in upward vertical scroll.

Figure 13:
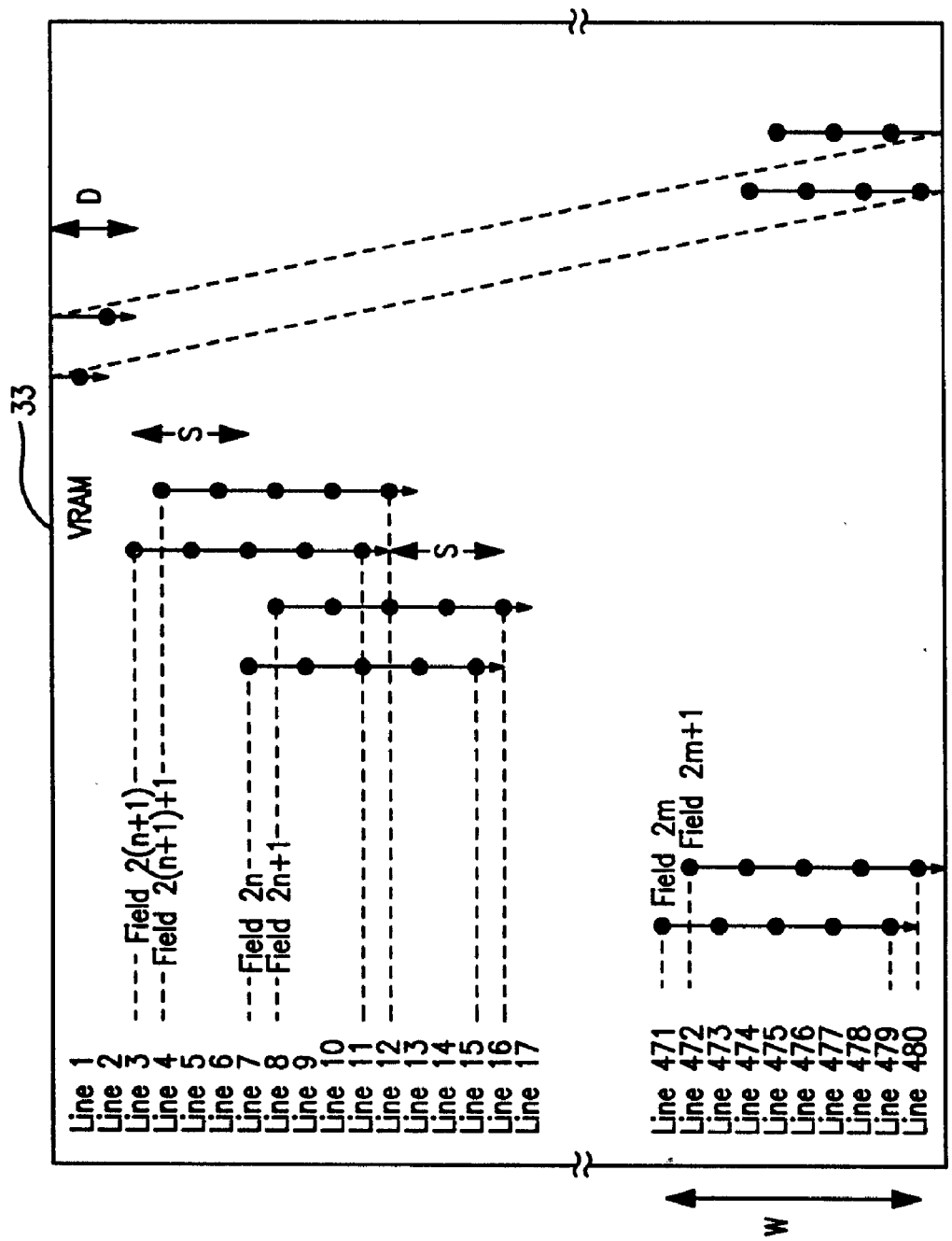
FIG. 13 is a diagram for explaining the technique of reading out teletext data from VRAM for realizing display of teletext, signal while scrolling vertically in the downward direction.

The vertical scroll may be also downward. This is explained by reference to FIG. 13. In field 2*m*, odd-number lines are read out from line 471 of the YRAM 833 for the portion of W lines (up to line 479, W=10). In field 2*m*+1, even-number lines are read out from line 472 for the portion of W lines (up to line 480). As a result, teletext signals for the portion of one frame are displayed in the lower screen portion 51*b*.

Further ahead, in field 2*n*, for example, odd-number lines are read out from line 7 of the VRAM 833 for the portion of W lines (up to line 15). In field 2*n*+1, even-number lines are read out from line 8 for the portion of W lines (up to line 16). As a result, teletext signals for the portion of one frame are displayed in the lower screen portion 851*b*.

In succession, in field 2(*n*+1), shifting the read start line by S lines (S=4 in the diagram), odd-number lines are read out from line 3 for the portion of W lines (up to line 11). Next, in field 2(*n*+1)+1, even-number lines are read out from line 4 for the portion of W lines (up to line 12). As a result, the teletext signals for the next one frame are displayed in the lower screen portion 851*b*. In this stage, from line 12 to line 16 of the VRAM 833 shifting by S lines, the data to be displayed in next cycle is extracted from the teletext data accumulated in the memory 832 and written in to update.

Similarly, thereafter, the VRAM 833 is read out up to line 1, and as approaching line 1, the portion of W lines runs short, and in such a case, returning to line 480, the portion of W lines is read out. In this stage, the data is updated from line D to line 480 of the VRAM 833.

The above operation is more specifically described below. In field 2*m*, lines 471, 473, 475, 477, 479 are read out; in field 2*m*+1, lines 472, 474, 476, 478, 480 are read out; and further ahead, in field 2*n*, for example, lines 7, 9, 11, 13, 15 are read out; in field 2*n*+1, lines 8, 10, 12, 14, 16 are read out; in field 2(*n*+1), lines 3, 5, 7, 9, 11 are read out; and in field 2(*n*+1)+1, lines 4, 6, 8, 10, 12 are read out, and in this way the teletext signals are displayed in the lower screen portion 851*b* in downward vertical scroll.

Although omitted in the above explanation of operation, the bit map data being read from the VRAM 833 by vertical scroll as mentioned above is sequentially written into the line memory 835 by the portion of one line each, and is read out from the line memory 835 by the display clock corresponding to the display in the lower screen portion 851*b*, and the data of the foreground color generated in the foreground color/background color generating circuit 841 in the color data conversion circuit 836 is developed into color data of R, G, B in the lookup table 842, and converted into analog teletext signals (R, G, B signals) in the D/A converting circuit 837, and issued from the teletext signal receiving circuit 824.

The data is further issued to the picture tube 812 from the picture tube drive circuit 811 through the switch 826, and is displayed in the vertical scroll state in the lower screen portion 851*b*.

The bit map data being read out from the line memory 835 and the background color data generated in the foreground color/background color generating circuit 841 in the color data converting circuit 836 are fed into the opaque color control signal generating circuit 843 in the color data converting circuit 836 and the teletext signal/video chroma signal changeover signal generating circuit 844.

The opaque color control signal generating circuit 843 generates an opaque color control signal corresponding to the background color, that is, a YM signal, and issues to the video chroma signal processing circuit 823. The video chroma signal processing circuit 823 converts the video chroma signal to the opaque color corresponding to the background color.

The teletext signal/video chroma signal changeover signal generating circuit 844 generates a teletext signal/video chroma signal changeover circuit corresponding to the background color, that is, a YS signal, and issues to the switch 826.

As a result, in the lower screen portion 851*b* of the picture tube 828, the background color of the teletext signal (foreground color) displayed in vertical scroll becomes an opaque color, and a video chroma signal lowered in luminance level is displayed in the background. The video chroma signal lowered in luminance is expressed in halftone in FIG. 11(*b*).

Meanwhile, as clear from FIG. 11(*b*), the video chroma signal is displayed in the upper screen portion 851*a* of a larger area of the full screen 851 with aspect ratio of 16:9 known as wide screen, the teletext signal (foreground color) is displayed in the lower screen portion 851*b* of a smaller area in vertical scroll, and the video chroma signal is displayed in opaque color behind the background color of opaque color of the surrounding.

As a result, both the video chroma signal and teletext signal in vertical scroll are both easy to see. No-picture area is not present at all, and therefore the video chroma signal can be displayed largely in an easy-to-view state in the upper screen portion 851*a*.

Incidentally, the lower screen portion 851*b* is smaller in area, but it does not matter for the viewer because the teletext signal is scrolled vertically, and therefore the full screen (wide screen) is utilized effectively.

In this embodiment, the opaque processing by YS signal is mentioned, but, needless to say, the same effects are obtained by the processing of merely decreasing the luminance.

Embodiment 3

Figure 14:
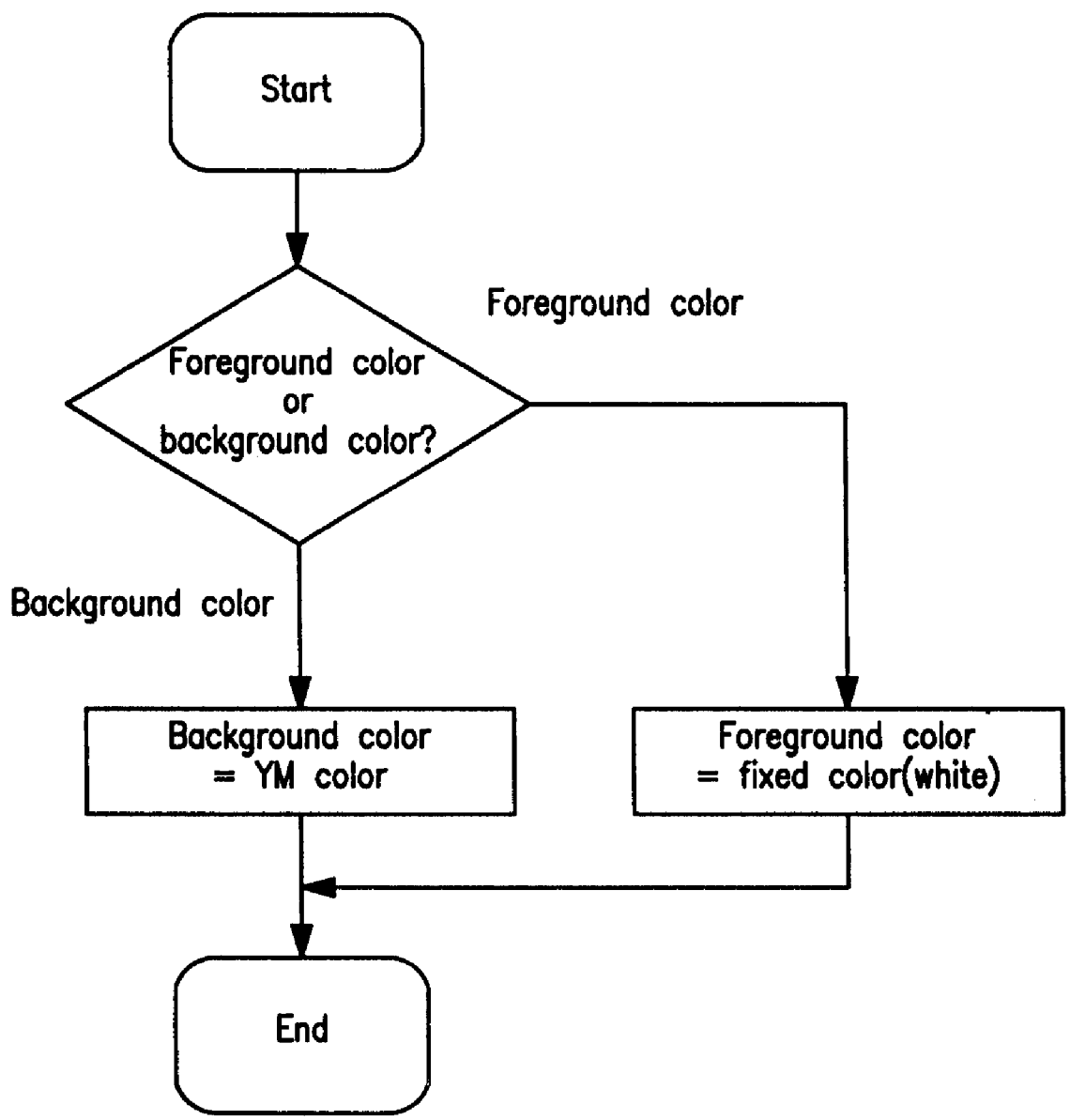
FIG. 14 is a flowchart of color data conversion process of a third embodiment.

A general constitution of the television receiver for teletext according to a third embodiment of the invention is similar to FIG. 8, and the internal structure of the teletext signal receiving circuit 824 is similar to FIG. 9, and therefore their illustration and description are omitted. FIG. 14 is a flowchart of the color data conversion processing circuit 838*a* in the television receiver for teletext according to the third embodiment. This color data conversion processing circuit 838a is processed at the same position as in the color data conversion processing circuit 38 in FIG. 9. In FIG. 14, what differs from the second embodiment in FIG. 10 is that the teletext decoded data is converted into the fixed foreground color of determined type of color, in the case of foreground color, and stored in the memory 832. As the fixed foreground color, for example, white is available and white is preferable.

For vertical scroll display, the method of reading out by W lines each in each field while shifting the read start line by the portion of S lines sequentially from the VRAM 833, and writing into the line memory 835 is same as in the second embodiment.

The bit map data being read out from the YRAM 833 in vertical scroll as mentioned above is sequentially written into the line memory 835 by the portion of one line each, and is read out from the line memory 835 by the display clock corresponding to the display in the lower screen portion 851b, and converted into color data of R, G, B in the lookup table 842, and converted into analog R, G. B teletext signals in the D/A converting circuit 837, and issued from the teletext signal receiving circuit 824. The data is further issued to the picture tube 828 from the picture tube drive circuit 827 through the switch 826, and is displayed in the lower screen portion 851b as fixed foreground color (for example, white) in vertical scroll state.

The bit map data being read out from the line memory 835 is fed into the opaque color control signal generating circuit 843 and teletext signal/video chroma signal changeover signal generating circuit 844. The opaque color control signal generating circuit 843 generates an opaque color control signal, that is, a YM signal, and issues to the video chroma signal processing circuit 823. The video chroma signal processing circuit 823 converts the video chroma signal into an opaque color corresponding to the YM signal. The teletext signal/video chroma signal changeover signal generating circuit 844 generates a teletext signal/video chroma signal changeover signal, that is, a YS signal, and issues to the switch 826.

Figure 15B:
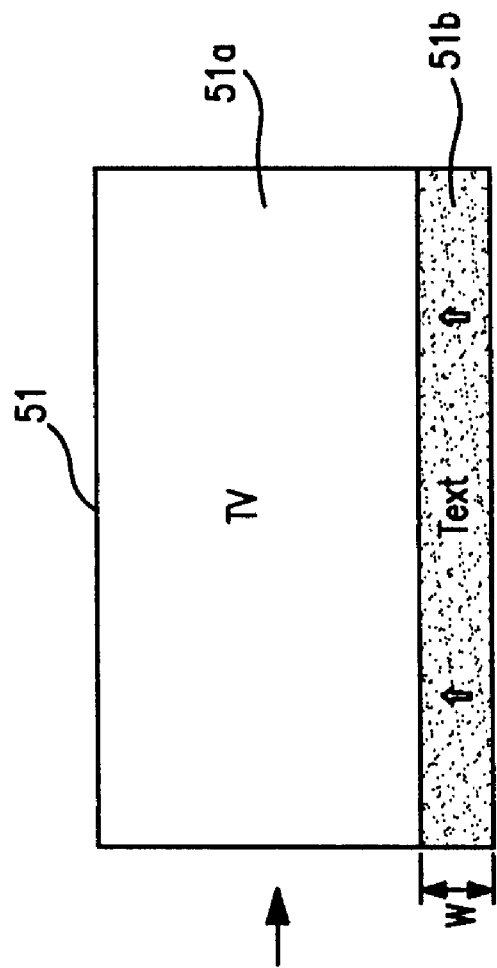
FIG. 15(a) is a diagram showing display of television signal only, and (b) display of two screens in a vertical scroll display state of teletext signal in the third embodiment.
Figure 15A:
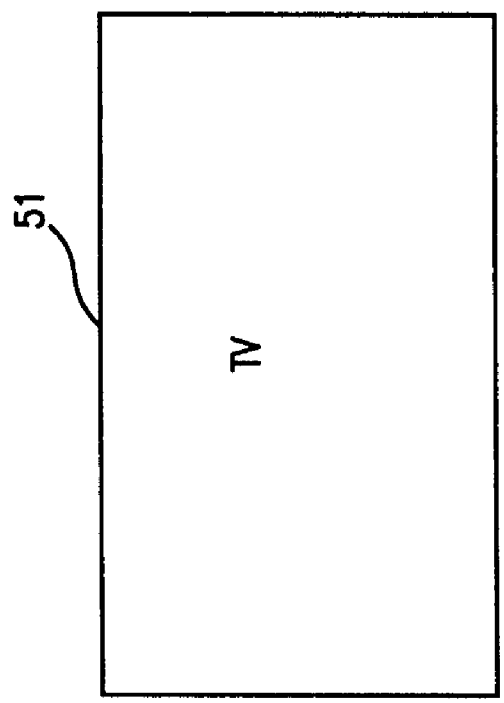

As a result, in the lower screen portion 851b of the picture tube 828, the background color of the teletext signal (fixed foreground color, for example, white) displayed in vertical scroll is changed to an opaque color, and the video chroma signal lowered in luminance level is displayed behind. The teletext signal of the fixed foreground color (for example, white) is displayed in a reversal state in FIG. 15(b), and the video chroma signal lowered in luminance is expressed in halftone. The vertical scroll is indicated by an upward arrow. Since the teletext signal of vertical scroll is displayed in fixed foreground color (for example, white), the text display state is easier to read than in the second embodiment.

Embodiment 4

A general constitution of the television receiver for teletext according to a fourth embodiment of the invention is similar to FIG. 8, and the internal structure of the teletext signal receiving circuit 824 is similar to FIG. 9, and therefore their illustration and description are omitted.

Figure 16:
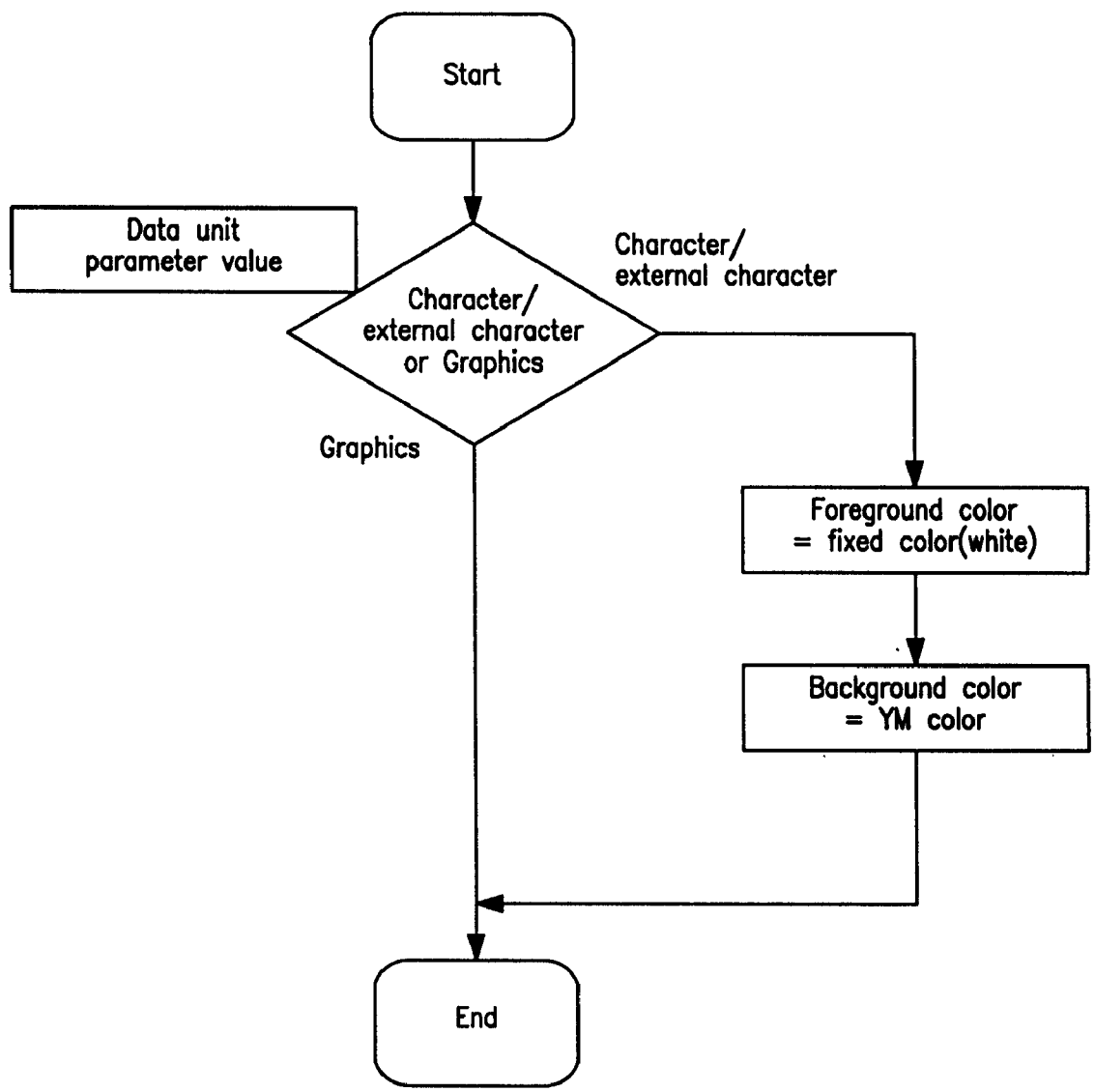
FIG. 16 is a flowchart of color data conversion process of a fourth embodiment.

FIG. 16 is a flowchart of the color data conversion processing circuit 838b in the television receiver for teletext according to the fourth embodiment. This color data conversion processing circuit 838b is processed at the same position as in the color data conversion processing circuit 838 in FIG. 9. In FIG. 16, what differs from the second embodiment in FIG. 10 and the third embodiment in FIG. 14 is that the decoded data is judged to be whether character/ external character or graphics on the basis of the data unit parameter value of the teletext decoded data, and the foreground color is the fixed foreground color and the background color is converted to YM color in the case of character/external character. In the case of graphics, the decoded data is issued directly, and stored in the memory 832. Incidentally, the fixed foreground color is, for example, white, and white is preferred.

For vertical scroll display, the method of reading out by W lines each in each field while shifting the read start line by the portion of S lines sequentially from the VRAM 833, and writing into the line memory 835 is same as in the first embodiment.

The bit map data being read out from the VRAM 833 in vertical scroll as mentioned above is sequentially written into the line memory 835 by the portion of one line each, and is read out from the line memory 835 by the display clock corresponding to the display in the lower screen portion 851b, and converted into color data of R, G, B in the lookup table 842, and converted into analog R, G, B teletext signals in the D/A converting circuit 837, and issued from the teletext signal receiving circuit 824. The data is further issued to the picture tube 828 from the picture tube drive circuit 827 through the switch 826, and is displayed in the lower screen portion 851b as fixed foreground color (for example, white) in vertical scroll state.

The bit map data being read out from the line memory 835 is fed into the opaque color control signal generating circuit 843 and teletext signal/video chroma signal changeover signal generating circuit 844. The opaque color control signal generating circuit 843 generates an opaque color control signal, that is, a YM signal, and issues to the video chroma signal processing circuit 823. The video. chroma signal processing circuit 823 converts the video chroma signal into an opaque color corresponding to the YM signal. The teletext signal/video chroma signal changeover signal generating circuit 844 generates a teletext signal/video chroma signal changeover signal, that is, a YS signal, and issues to the switch 826.

Since the teletext signal of vertical scroll is displayed in fixed foreground color (for example, white), the text display state is easier to read than in the second embodiment, and moreover the graphics are displayed without color data conversion, so that the graphics are sharper than in the third embodiment.

Embodiment 5

A general constitution of the television receiver for teletext according to a fifth embodiment of the invention is similar to FIG. 8, and the internal structure of the teletext signal receiving circuit 824 is similar to FIG. 9, and therefore their illustration and description are omitted.

Figure 17:
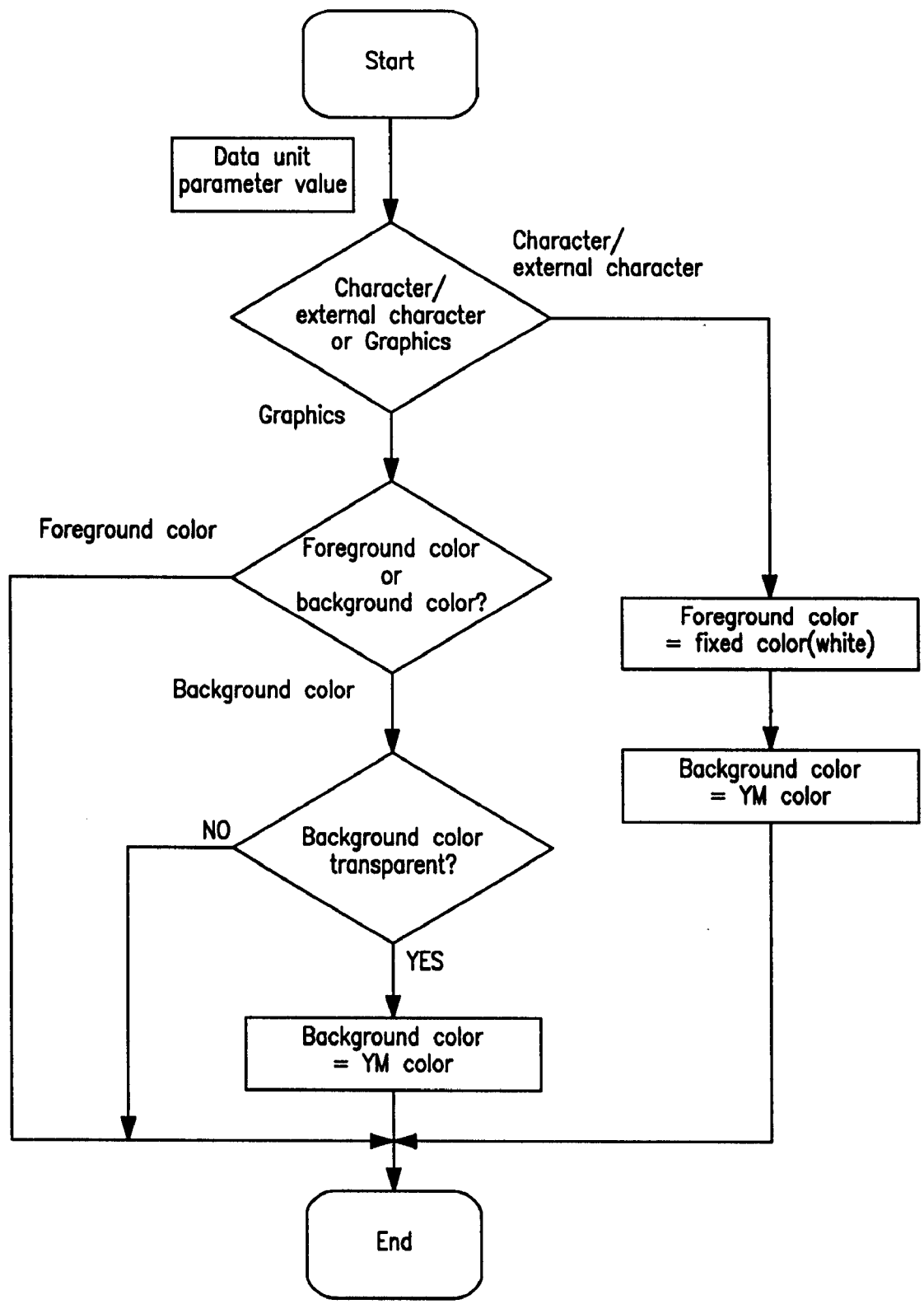
FIG. 17 is a flowchart of color data conversion process of a fifth embodiment.

FIG. 17 is a flowchart of the color data conversion processing circuit 838c in the television receiver for teletext according to the fifth embodiment.

The color data conversion processing circuit 838c is processed at the same position as in the color data conversion processing circuit 838 in FIG. 9. In FIG. 17, what differs from the second embodiment in FIG. 10, third embodiment in FIG. 14, and fourth embodiment in FIG. 16 is that the decoded data is judged to be character/external character or graphics depending on the data unit parameter value of the teletext decoded data, and in the case of character/external character, the foreground color is the fixed foreground color and the background color is converted to YM color. In the case of graphics, the foreground color and background color are discriminated, and in the case of the foreground color, its decoded value is issued, and in the case of the background color, the background color is converted to YM color if the decoded value is a transparent color, or the decoded value is issued if not transparent color and is stored in the memory 832. The fixed foreground color is, for example, white, and white is preferred.

For vertical scroll display, the method of reading out by W lines each in each field while shifting the read start line by the portion of S lines sequentially from the VRAM 833, and writing into the line memory 835 is same as in the second embodiment.

The bit map data being read out from the YRAM 833 in vertical scroll as mentioned above is sequentially written into the line memory 835 by the portion of one line each, and is read out from the line memory 835 by the display clock corresponding to the display in the lower screen portion 851b, and converted into color data of R, G, B in the lookup table 842, and converted into analog R, G, B teletext signals in the D/A converting circuit 837, and issued from the teletext signal receiving circuit 824. The data is further issued to the picture tube 828 from the picture tube drive circuit 827 through the switch 826, and is displayed in the lower screen portion 851b as fixed foreground color (for example, white) in vertical scroll state.

The bit map data being read out from the line memory 835 is fed into the opaque color control signal generating circuit 843 and teletext signal/video chroma signal changeover signal generating circuit 844. The opaque color control signal generating circuit 843 generates an opaque color control signal, that is, a YM signal, and issues to the video chroma signal processing circuit 823. The video chroma signal processing circuit 823 converts the video chroma signal into an opaque color corresponding to the YM signal. The teletext signal/video chroma signal changeover signal generating circuit 844 generates a teletext signal/video chroma signal changeover signal, that is, a YS signal, and issues to the switch 826.

Since the teletext signal of vertical scroll is displayed in fixed foreground color (for example, white), the text display state is easier to read than in the second embodiment, and moreover since the foreground color of the graphics is directly displayed, the graphics are sharper than in the third embodiment. Still more, by showing the transparent color of the graphics in the YM color, the viewer is easier to see than in the fourth embodiment.

Embodiment 6

Figure 18:
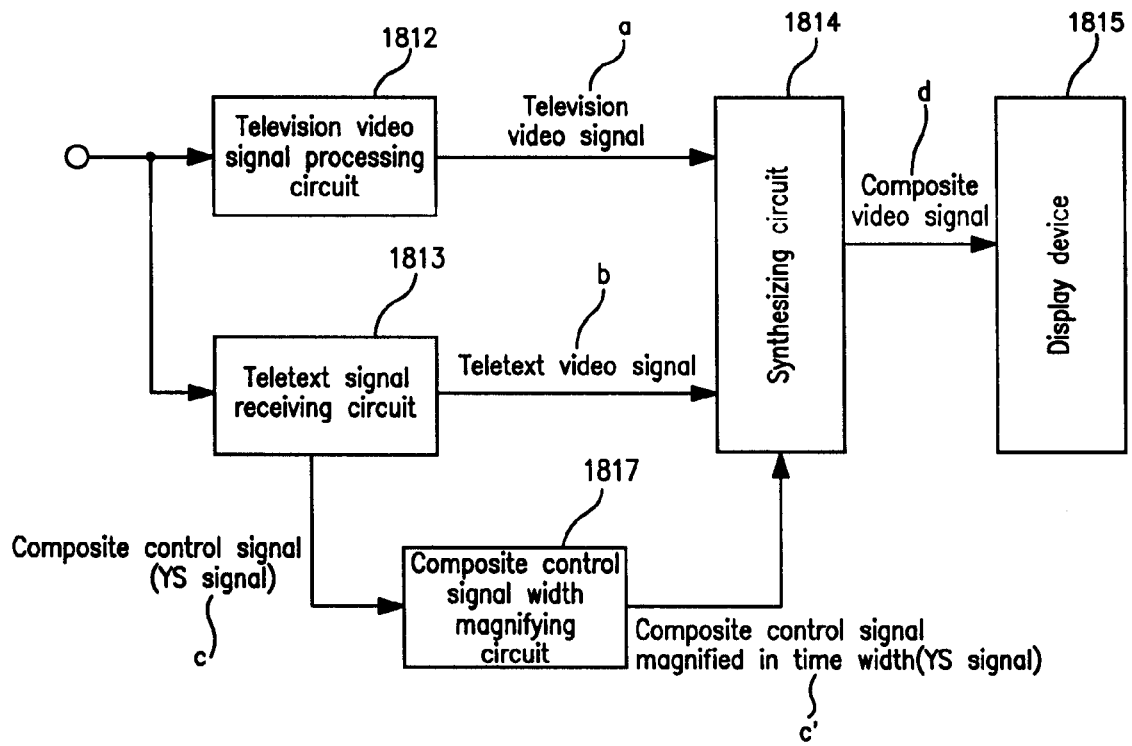
FIG. 18 is a block diagram showing a constitution of television receiver for teletext according to a sixth embodiment of the invention.

FIG. 18 is a block diagram showing a schematic constitution of a television receiver of teletext according to a sixth embodiment of the invention. In FIG. 18, reference numeral 1811 is an input terminal of a demodulated composite video signal, 1812 is a television video signal processing circuit for receiving the composite video signal and converting into a television video signal a, and 1813 is teletext signal receiving circuit for extracting a teletext signal superposed in the vertical blanking period of the input composite video signal, converting into a teletext video signal b, and also generating a composite control signal (YS signal) c synchronized with the teletext video signal b. Reference numeral 1817 is a composite signal width magnifying circuit for receiving the composite control signal (YS signal) c and magnifying its time width, and c' is a composite control signal (YS signal) magnified in the time width. Reference numeral 1814 is a synthesizing circuit for superimposing the teletext video signal b from the teletext signal receiving circuit 1813 on the television video signal a from the television video signal processing circuit 1812 on the basis of the composite control signal (YS signal) c' magnified in the time width from the composite control signal width magnifying circuit 1817, and 1815 is a display device such as CRT and LCD for displaying its composite video signal d. The aspect ratio of the screen of the display device 1815 may be either 16:9 or 4:3.

Figure 19:
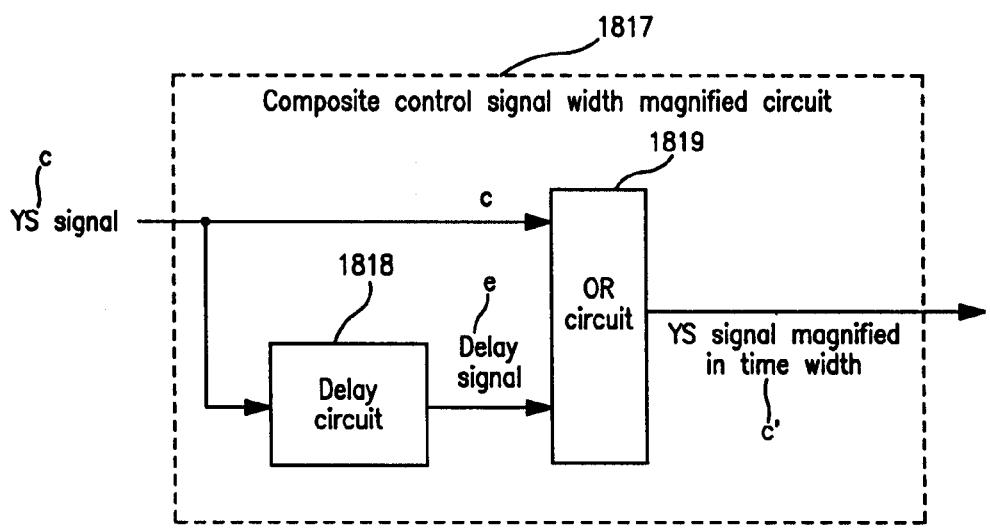
FIG. 19 is a block diagram showing an internal constitution of a composite control signal width magnifying circuit in the sixth embodiment.

The composite control signal width magnifying circuit 1817 is composed of, as shown in FIG. 19, a delay circuit 1818 for delaying the composite control signal (YS signal) c by specific time to generate a delay signal e (a first delay circuit), and an OR circuit 1819 for calculating OR of YS signal c and delay signal e, and generating a composite control signal (YS signal) c' magnified in time width.

Figure 20:
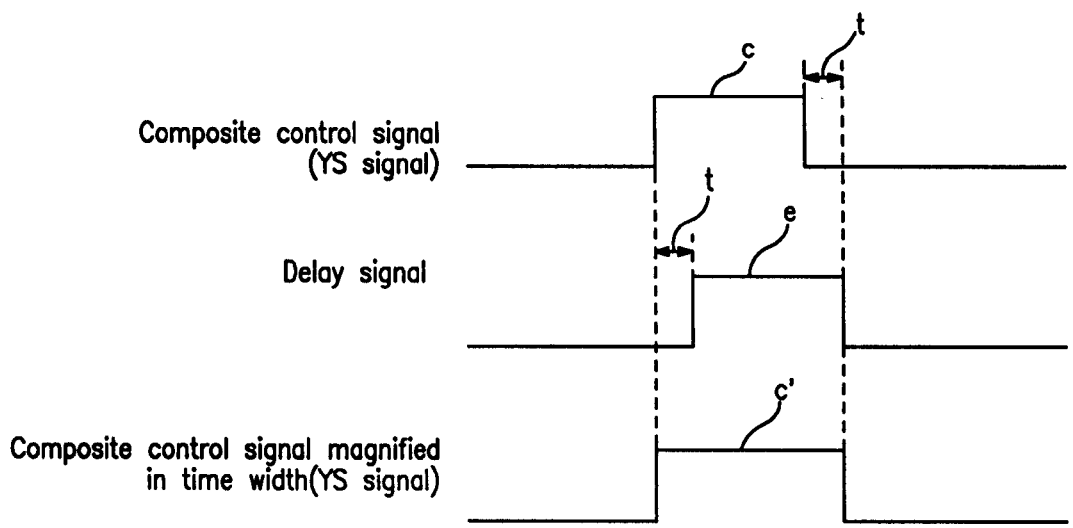
FIG. 20 is a timing chart showing generation of composite control signal magnified in time width in the sixth embodiment.

The operation is described below. FIG. 20 shows the mode of generating the composite control signal (YS signal) c' magnified in time width by the composite control signal width magnifying circuit 1817. The YS signal c is fed into the delay circuit 1818, and is turned into a delay signal e delayed by specific delay time t, and is put into the OR circuit 1819. In the OR circuit 1819, the YS signal c and delay signal e are entered, and the OR of the both signals is calculated, and the composite control signal (YS signal) c' magnified in time width by the delay time t than the YS signal c is generated.

Figure 21A:
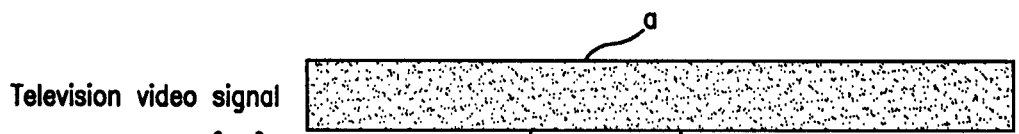
FIG. 21 is a timing chart for explaining the operation of the sixth embodiment.
Figure 21B:
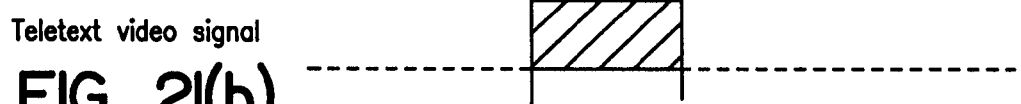
Figure 21C:
Figure 21D:
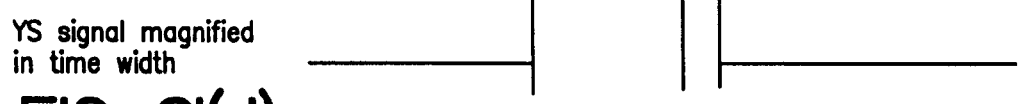
Figure 21E:
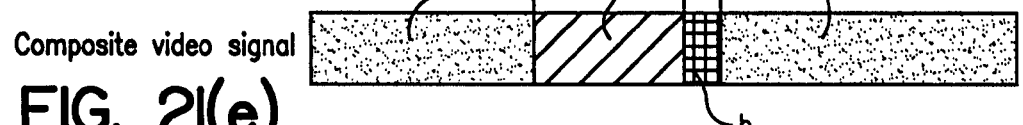

FIG. 21(a) shows television video signal a in part of one horizontal line, and FIG. 21(b) shows teletext video signal b in part of one horizontal line. FIG. 21(c) shows a composite control signal c generated by the teletext signal receiving circuit 1813, and FIG. 21(d) shows the composite control signal (YS signal) c' magnified in the time width by time t as explained in FIG. 20. This composite control signal c' is magnified backward in time relatively to the teletext video signal b. The television video signal a from the television video signal processing circuit 1812 and the teletext video signal b from the teletext signal receiving circuit 1813 are fed into the synthesizing circuit 1814, and are synthesized according to the composite control signal (YS signal) c' magnified in time width from the composite control signal width magnifying circuit 1817, and becomes a composite video signal d as shown in FIG. 21(e).

In this composite video signal d, the television video signal a is missing at the timing of the YS signal c' magnified in the time width. In this missing portion of television video signal a, the teletext video signal b and its right side black level signal b, are present. Such composite video signal d is sent into the display device 1815, and is displayed on the screen of the display device 1815.

Figure 22:
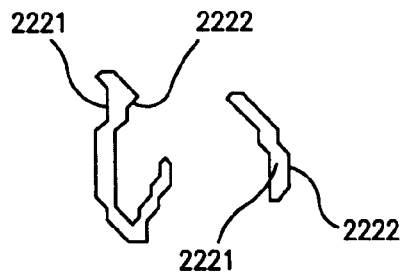
FIG. 22 is a diagram showing display state of one letter in the displayed superimposed text in the sixth embodiment.

This display state is as shown in FIG. 22, in which there is a letter (for example, "l") 2221 in the foreground of the television video signal a, and a black trimming 2222 is present at the right side of the margin of the letter 2221. Therefore, it is easier to read the superimposed text. In particular, if the luminance level of the television picture and teletext image is close to each other, the boundary of the two is clear because of the black trimming around the letter, and it is easier to read the letter.

Embodiment 7

Figure 23:
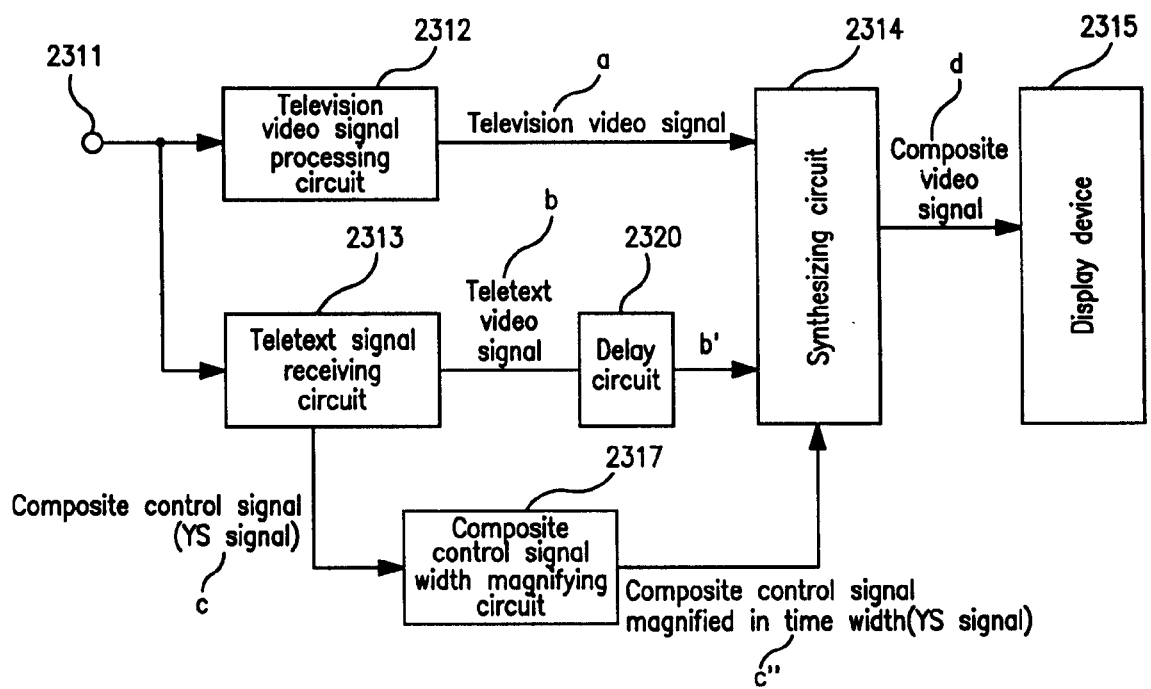
FIG. 23 is a block diagram showing a constitution of television receiver for teletext according to a seventh embodiment of the invention.

FIG. 23 is a block diagram showing a schematic constitution of a television receiver for teletext according to a seventh embodiment of the invention. In FIG. 23, reference numeral 2311 is an input terminal of composite video signal, 2312 is a television video signal processing circuit, a is a television video signal, 2313 is a teletext signal receiving circuit, b is a teletext video signal, c is a composite control signal (YS signal), 2317 is a composite control signal width magnifying circuit, c" is a composite control signal (YS signal) magnified in time width by 2t or twice the case of the first embodiment, 2314 is a synthesizing circuit of television video signal a and teletext video signal b, d is a composite video signal, and 2315 is a display device. The internal structure of the composite control signal width magnifying circuit 2317 is similar to FIG. 19, and comprises a delay circuit 2318 and an OR circuit 2319. However, the delay time of the delay circuit 2318 is twice, that is, 2t. Aside from these constituent elements, there is also a delay circuit 2320 (a second delay circuit) for delaying the teletext signal b from the teletext signal receiving circuit 2313 by time t. The teletext video signal b' delayed by the delay circuit 2320 is put into the synthesizing circuit 2314.

The operation is described below. As shown in FIG. 24(*b*), (*c*), the teletext video signal b from the teletext signal receiving circuit 2313 is delayed by delay time t by the delay circuit 2320, and becomes a delayed teletext video signal b'.

On the other hand, as shown in FIG. 24(*d*), (*e*), the composite control signal (YS signal) c from the teletext signal receiving circuit 2313 is magnified in time width by 2t behind in time by the composite control signal width magnifying circuit 2317, and becomes composite control signal (YS signal) c". The leading portion of the delayed teletext video signal b' is later by time t than the rise of the composite control signal (YS signal) c" magnified in time width, and the trailing portion of the delayed teletext video signal b' is earlier by time t than the fall of the composite control signal (YS signal) c" magnified in time width. Therefore, the composite video signal d having the television video signal a and delayed teletext video signal b' combined in the synthesizing circuit 2314 on the basis of the composite control signal (YS signal) c" magnified in time width becomes as shown in FIG. 24(*f*), and the television video signal a is missing at the timing of the YS signal c" magnified in time width. In this missing portion of television video signal a, the teletext video signal b' and its left side black level signal $b_2$ and right side black level signal $b_3$ are present. Such composite video signal d is sent into the display device 2315, and is displayed on the screen of the display device 2315.

This display state is as shown in FIG. 25, in which there is a letter (for example, "l") 2531 in the foreground of the television video signal a, and black trimmings 2532, 2533 are present at the left side and right side of the margin of the letter 2531, respectively.

Therefore, the boundary of the television picture and teletext image is clear because of the marginal black trimmings at right and left sides of the letter, and in particular, if the luminance level of the television picture and teletext image is close to each other, it is very easy to read the superimposed letter.

Embodiment 8

A television receiver for teletext according to an eighth embodiment of the invention is described below in detail while referring to the drawings. A general structure of the television receiver for teletext of the eighth embodiment of the invention is same as in the second embodiment shown in FIG. 8, and the internal structure of the teletext signal receiving circuit 824 is similar to FIG. 9, and therefore the illustration and explanation are partly omitted.

Figure 26:
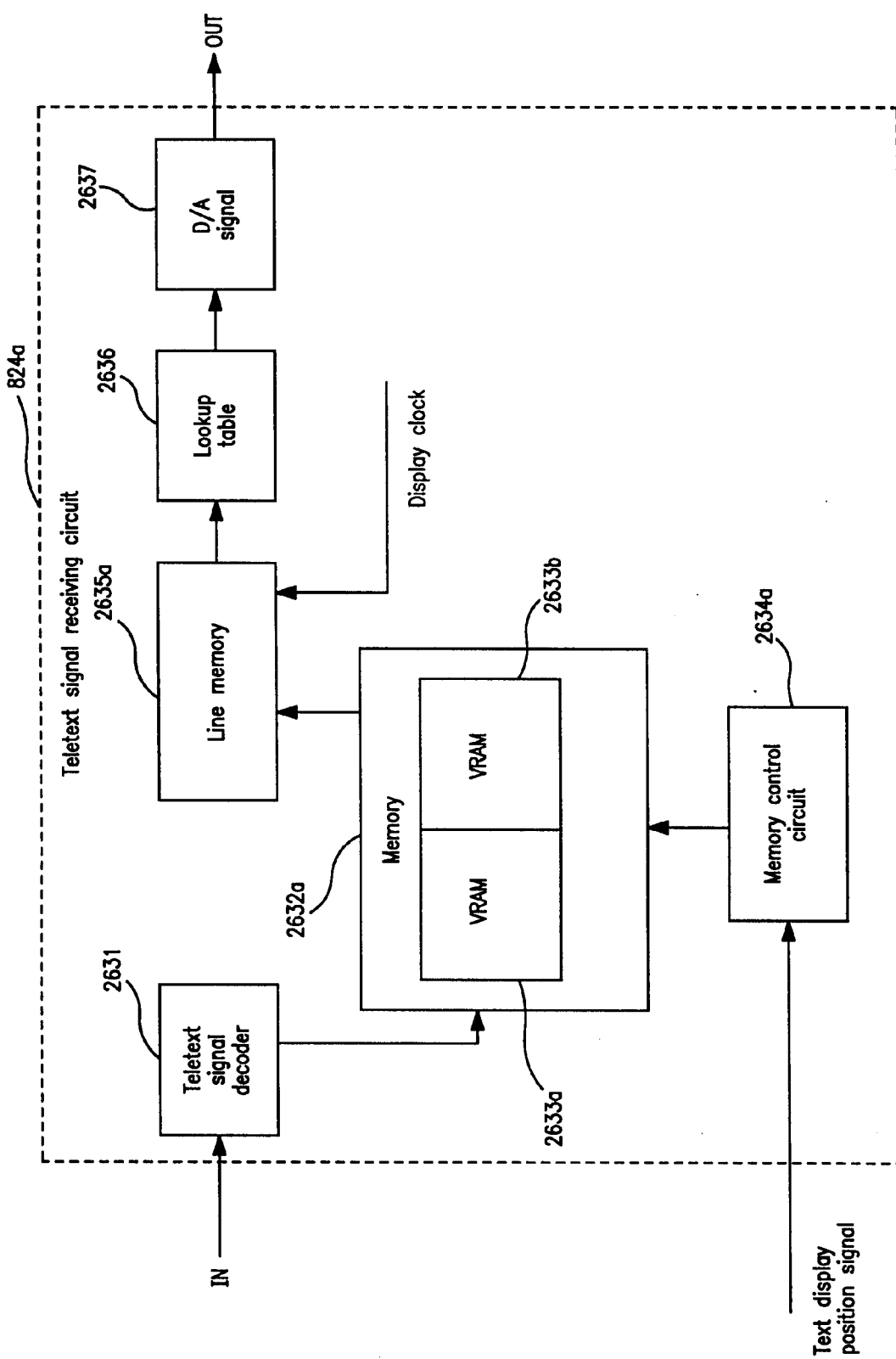
FIG. 26 is a block diagram showing an internal constitution of a teletext signal receiving circuit according to an eighth embodiment.

FIG. 26 is a block diagram showing the internal structure of the teletext signal receiving circuit 824. In FIG. 26, reference numeral 2631 is a teletext signal decoder for extracting and decoding the teletext signal superposed in the vertical blanking period from the input composite video signal, 2632 is a memory for storing the decoded teletext data, 2633 is a VRAM (video RAM) built in the memory 2632 for writing the display data in bit map format, 2634 is a memory control circuit for controlling writing and reading of the memory 2632 and VRAM 2633, 2635 is a line memory for temporarily storing teletext data for the portion of one horizontal line, 2636 is a lookup table (LUT) for developing the teletext data being read out from the line memory 2635 into color data, and 2637 is a D/A converting circuit for converting the developed color data into analog video signal. The memory control circuit 2634 reads out teletext data for the portion of specified lines (W lines) in every field from the VRAM 2633 according to the text display position signal, and transfers to the line memory 2635, and at the time of reading out, by sequentially shifting the reading start line in every field, it is designed to scroll vertically the teletext signal in the lower region of the wide screen of the picture tube 828.

The operation is described below. The composite video signal demodulated in the receiving circuit 822 in FIG. 8 is put into the teletext signal decoder 2631 of the teletext signal receiving circuit 824 shown in FIG. 26, and the decoded teletext data is accumulated in the memory 2632, and the data to be displayed of the accumulated teletext data is written into the VRAM 2633 in bit map format according to the write control signal from the memory control circuit 2634.

Figure 27:
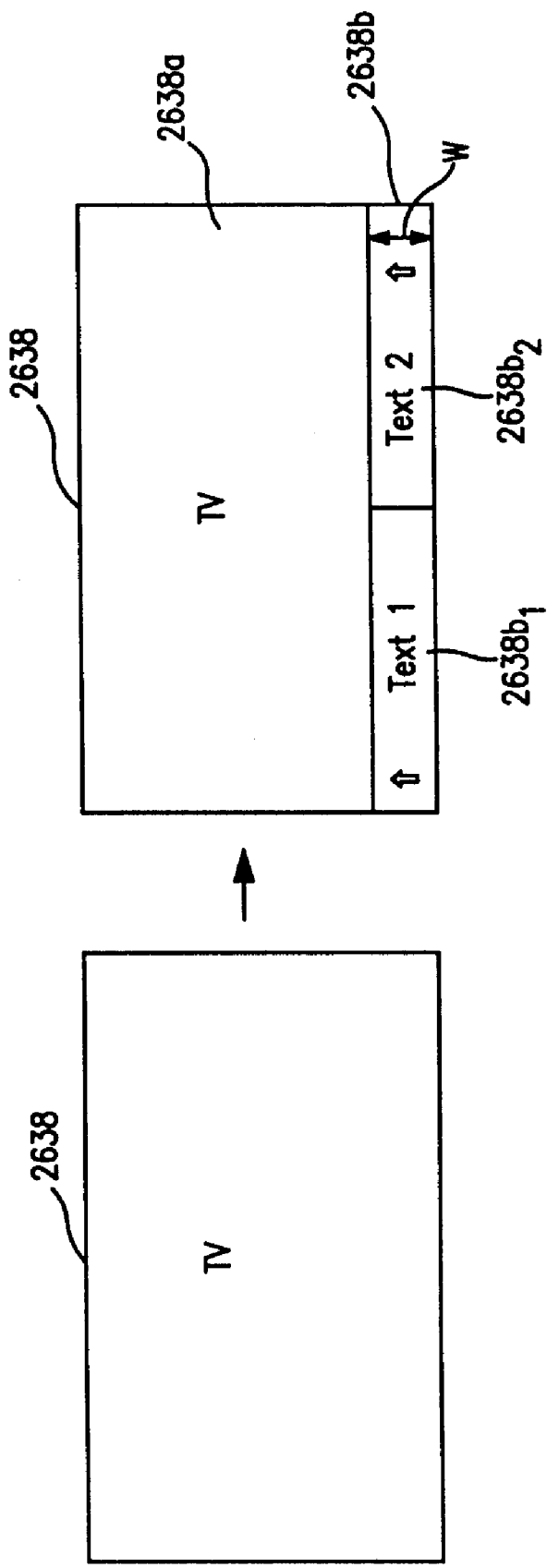
FIG. 27(a) is a diagram showing display of television signal only, and (b) display of three screens in a vertical scroll display state of teletext signal in a ninth embodiment.

The changeover action of the switch 826 in FIG. 8 allows to obtain a state of displaying only television video signals in the full screen 2638 with aspect ratio 16:9 or wide screen in the picture tube 828 as shown in FIG. 27(*a*), and a state of dividing vertically, as shown in FIG. 27(*b*), the full screen 2638 into an upper screen portion 2638*a* with a greater number of lines and a lower screen portion 2638*b* with a smaller number of lines (W), and displaying television video signals in the upper screen portion 2638*a*, and teletext signals in the lower screen portion 2638*b*, by scrolling vertically.

To realize display of teletext signal while scrolling vertically, the technique for reading out the teletext data from the VRAM 2633 is explained below by reference to the second embodiment in FIG. 12. FIG. 12 refers to the case of vertical scroll in upward direction. The memory control circuit 2634 reads out odd-number lines from the first line of the YRAM 2633 for the portion of W lines in field 2*n* (supposing W=10, reading up to line 9), on the basis of the text display position signal. In time series, each line is read out and is sequentially written into the line memory 2635. Consequently, in field 2*n*+1, from the second line, even-number lines are read out for the portion of W lines (up to line 10). As a result, the teletext signals for one frame area displayed in the lower screen portion 2638*b*. In succession, in field 2(*n*+1), shifting the read start line by S lines (S=4 in the diagram), odd-number lines are read out from line 5 for the portion of W lines (up to line 13). Next, in field 2(*n*+1)+1, even-number lines are read out from line 6 for the portion of W lines (up to line 14). As a result, the teletext signals for the next one frame are displayed in the lower screen portion 2638*b*. In this stage, from line 1 to line 4 of the VRAM 2633 shifting by S lines, the data to be displayed in next cycle is extracted from the teletext data accumulated in the memory 2632 and written into update.

Similarly, thereafter, the VRAM 2633 is read out up to line 480, and as approaching line 480, the portion of W lines runs short, and in such a case, returning to line 1, the portion of W lines is read out. In this stage, the data is updated from line 1 to line (480-D) of the VRAM 2633.

The above operation is more specifically described below. In field 2n, lines 1, 3, 5, 7, 9 are read out; in field 2n+1, lines 2, 4, 6, 8, 10 are read out; in field 2(n+1), lines 5, 7, 9, 11, 13 are read out; and in field 2(n+1)+1, lines 6, 8, 10, 12, 14 are read out, and in this way the teletext signals are displayed in the lower screen portion 2638b in upward vertical scroll.

The vertical scroll may be also downward. This is explained by reference to the second embodiment in FIG. 13. In field 2m, odd-number lines are read out from line 471 of the VRAM 2633 for the portion of W lines (up to line 479, W=10). In field 2m+1, even-number lines are read out from line 472 for the portion of W lines (up to line 480). As a result, teletext signals for the portion of one frame are displayed in the lower screen portion 2638b. Further ahead, in field 2n, for example, odd-number lines are read out from line 7 of the VRAM 2633 for the portion of W lines (up to line 15). In field 2n+1, even-number lines are read out from line 8 for the portion of W lines (up to line 16). As a result, teletext signals for the portion of one frame are displayed in the lower screen portion 2638b. In succession, in field 2(n+1), shifting the read start line by S lines (S=4 in the diagram), odd-number lines are read out from line 3 for the portion of W lines (up to line 11). Next, in field 2(n+1)+1, even-number lines are read out from line 4 for the portion of W lines (up to line 12). As a result, the teletext signals for the next one frame are displayed in the lower screen portion 2638b. In this stage, from line 12 to line 16 of the VRAM 2633 shifting by S lines, the data to be displayed in next cycle is extracted from the teletext data accumulated in the memory 2632 and written into update.

Similarly, thereafter, the VRAM 2633 is read out up to line 1, and as approaching line 1, the portion of W lines runs short, and in such a case, returning to line 480, the portion of W lines is read out. In this stage, the data is updated from line D to line 480 of the VRAM 2633.

The above operation is more specifically described below. In field 2m, lines 471, 473, 475, 477, 479 are read out; in field 2m+1, lines 472, 474, 476, 478, 480 are read out; and further ahead, in field 2n, for example, lines 7, 9, 11, 13, 15 are read out; in field 2n+1, lines 8, 10, 12, 14, 16 are read out; in field 2(n+1), lines 3, 5, 7, 9, 11 are read out; and in field 2(n+1)+1, lines 4, 6, 8, 10, 12 are read out, and in this way the teletext signals are displayed in the lower screen portion 2638b in downward vertical scroll.

Although omitted in the above explanation of operation, the data being read from the VRAM 2633 by vertical scroll as mentioned above is sequentially written into the line memory 2635 by the portion of one line each, and is read out from the line memory 2635 by the display clock corresponding to the display in the lower screen portion 2638b, and is developed into the color data in the lookup table 2636, and converted into analog teletext signals (R, G, B signals) in the D/A converting circuit 2637, and issued from the teletext signal receiving circuit 824. The data is further issued to the picture tube 828 from the picture tube drive circuit 827 through the switch 826, and is displayed in the vertical scroll state in the lower screen portion 2638b.

As clear from FIG. 27(b), the television video signal is displayed in the upper screen port-ion 2638a of a larger area of the full screen 2638 with aspect ratio of 16:9 known as wide screen, the teletext signal is displayed in the lower screen portion 2638b of a smaller area in vertical scroll, and hence no-picture area is absent completely. Therefore, if there is a no-picture portion 512c of a relatively large area as shown in FIG. 6, as compared with the prior art producing the screen 512a of television video signal of small area with aspect ratio of 4:3, the television video signal can be displayed largely so as to be viewed easily. Although the lower screen portion 2638b is smaller in area, it does not matter for the viewer because the teletext signal is scrolled vertically, and therefore the full screen (wide screen) is utilized effectively.

Embodiment 9

A general structure of the television receiver for teletext of a ninth embodiment of the invention is similar to that of the eighth embodiment shown in FIG. 8, and the internal structure of the teletext signal receiving circuit 824 is similar to FIG. 9, and therefore the illustration and explanation are partly omitted. Reference is made to FIG. 26 which is also used in explanation of the eighth embodiment.

In FIG. 26, reference numeral 2631 is a teletext signal decoder for extracting and decoding the teletext signal superposed in the vertical blanking period from the input composite video signal, 2632a is a memory for storing the decoded teletext data, 2633a and 2633b are two VRAMs (video RAMs) built in the memory 2632a for writing the display data in bit map format, and 2634a is a memory control circuit for controlling writing and reading of the memory 2632a and VRAMs 2633a, 2633b. The two YRAMs 2633a and 2633b each have a same capacity as the VRAM 2633 in the eighth embodiment, and hence the capacity is double on the whole. In the both VRAMs 2633a, 2633b, contents of different pages of a same program may be stored, or different program contents are stored individually. Reference numeral 2635a is a line memory for temporarily storing teletext data for the portion of one horizontal line of each one of the VRAMs 2633a, 2633b, and the capacity of this line memory 2635a is two times as large as that of the first embodiment, and reading of data from the line memory 2635a is effected by the display clock of the double frequency of the eighth embodiment. Reference numeral 2636 is a lookup table (LUT) for developing the teletext data being read out from the line memory 2635a into color data, and 2637 is a D/A converting circuit for converting the developed color data into analog video signal. The memory control circuit 2634a reads out teletext data for the portion of specified lines (W lines) in every field from the both VRAMs 2633a, 2633b according to the text display position signal, and transfers to the line memory 2635a, and at the time of reading out, by sequentially shifting the reading start line in every field, it is designed to scroll vertically the teletext signal in the lower region of the wide screen of the picture tube 828.

In the case of the ninth embodiment, the changeover action of the switch 826 allows to obtain a state of displaying television video signals in the full screen 2638 with aspect ratio 16:9 as shown in FIG. 27(a), and a state of displaying television video signals in the upper screen portion 2638a, and displaying different teletext signals in the left screen portion 2638b, and right screen portion 2638b₂, by dividing lower screen portion 2638b into two parts in the horizontal direction, by scrolling vertically, as shown in FIG. 27(b).

For vertical scroll display, it is same as in the eighth embodiment that W lines each are read out in every field while shifting the reading start line sequentially from the both VRAMs 2633a, 2633b by the portion of S lines, and written into the line memory 2635a.

By reading out the data at display clock of double frequency of the eighth embodiment from the line memory 2635a, the two teletext signals of the both YRAMs 2633a, 2633b are displayed respectively in the left screen portion 2638b₁ and right screen portion 2638b₂, while scrolling vertically.

Embodiment 10

Figure 28:
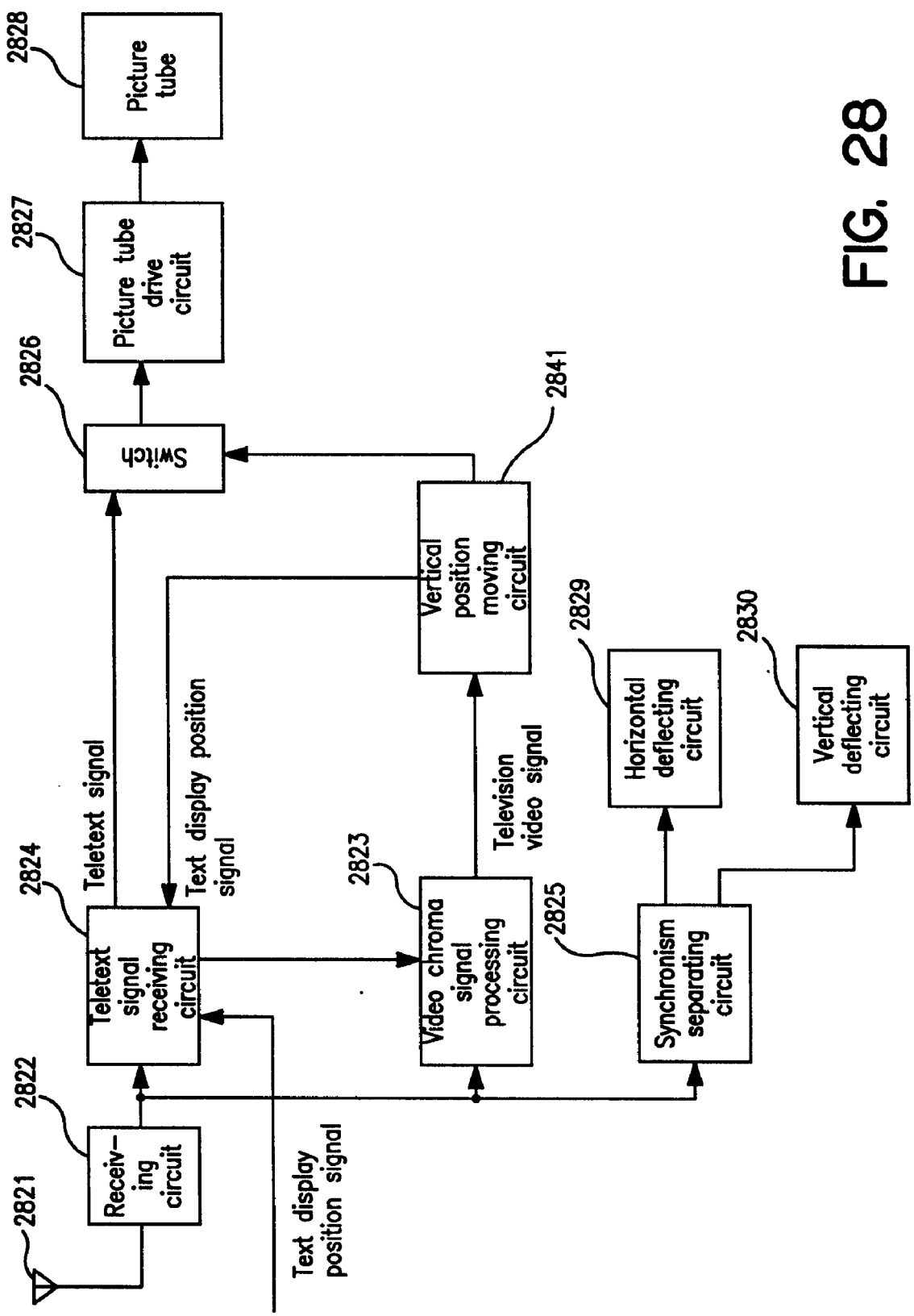
FIG. 28 is a block diagram showing a constitution of television receiver for teletext according to a tenth embodiment of the invention.

FIG. 28 is a block diagram showing a constitution of a television receiver for teletext according to a tenth embodiment of the invention. Reference numerals 2821 to 2830 are same as in FIG. 8 relating to the ninth embodiment, and the internal structure of the teletext signal receiving circuit 2824 is same as in FIG. 9, and when illustration and explanation are partly omitted. What differs from FIG. 8 is the addition of a vertical position moving circuit 2841 which moves the television video signal from the video chroma signal processing circuit 2823 to the upper side in the vertical direction, and sends out to the switch 2826.

Figure 29:
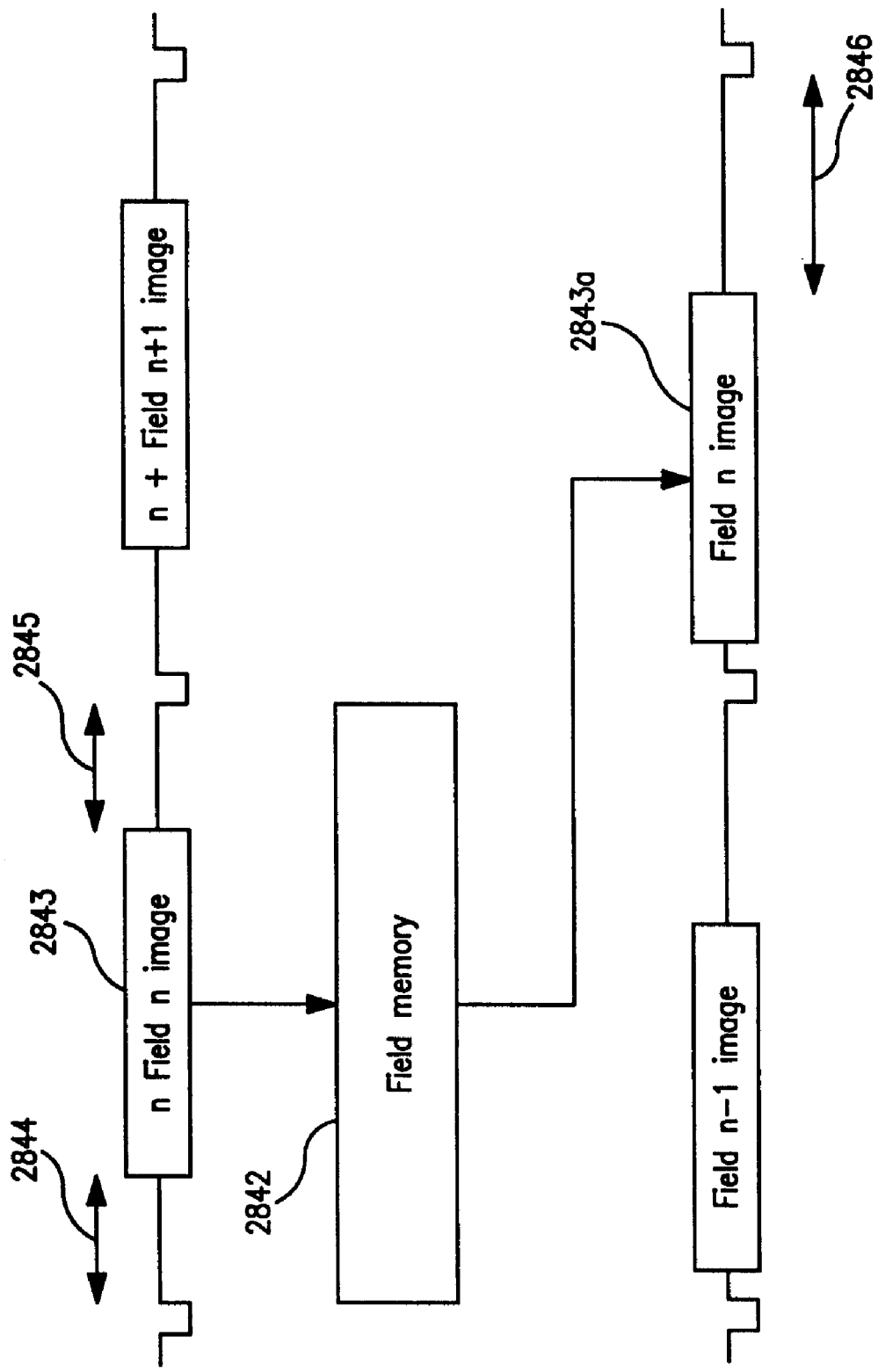
FIG. 29 is an explanatory diagram of operation of a vertical position moving circuit in the tenth embodiment.
Figure 3L:
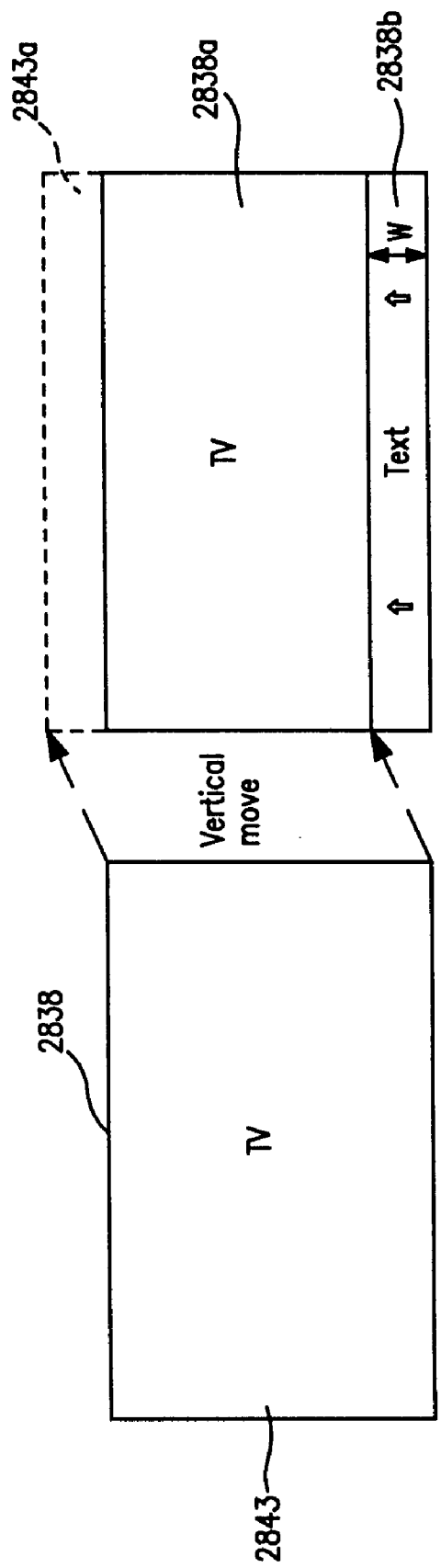

This vertical position moving circuit 2841 has a field memory 2842 as shown in FIG. 29. Reference numeral 2843 is a television video signal of n fields sent out from the video chroma signal processing circuit 2823, 2844 is a no-picture area preceding the television video signal 2843, and 2845 is a no-picture area succeeding it.

After writing the television video signal 2843 into the field memory 2842 at specified timing, when reading the television video signal 2843a from the field memory 2842, the memory is read in an advanced state of memory read timing so that the television video signal 2843a may start from the first line and that the no-picture area 2846 may come to the end of the field. As a result, as shown in FIG. 30(a), when the television video signal 2843 is a letter box picture, the display position is moved to the upper side in the vertical direction, so that the television video signal may start from the first line of the upper screen portion 2838a as shown in FIG. 30(b).

As a result of this moving, in the lower screen portion 2838b corresponding to the no-picture area 2846 for the portion of W lines formed at the lower side, the teletext signals of vertical scroll created in the teletext signal receiving circuit 2824 are displayed. The number of lines of the lower screen portion 2838b corresponding to the no-picture area 2846 is equal to the sum of the number of lines of the no-picture area 2844 and the number of lines of the no-picture area 2845, and the number of lines of television video signal after moving vertically to the upper screen portion 2838a is same as the number of lines of television video signal 2843 before moving. The operation of vertical scroll is same as in the first embodiment, and the direction of vertical scroll may be either upward or downward.

As shown in FIG. 31(a), when the television video signal 2843 is displayed in the full screen, the video signal 2843a for the portion of W lines at the upper side is cut off as indicated by broken line in FIG. 31(b) by the vertical position moving circuit 2841.

Embodiment 11

Figure 32:
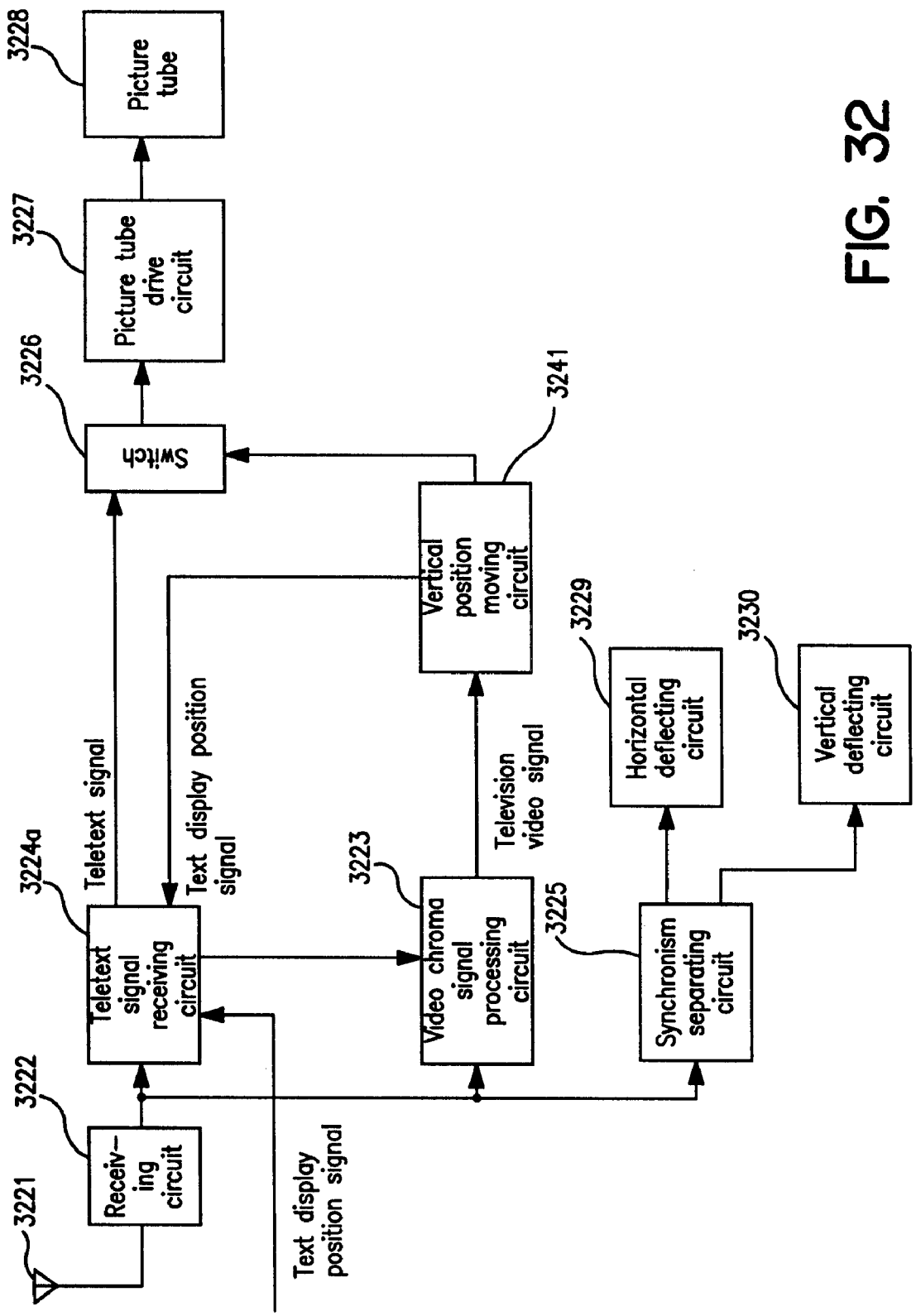
FIG. 32 is a block diagram showing a constitution of television receiver for teletext according to an eleventh embodiment of the invention.

FIG. 32 is a block diagram showing a constitution of a television receiver for teletext according to an eleventh embodiment of the invention. Reference numerals 3221 to 3223, and 3225 to 3230 are same as in FIG. 8 relating to the ninth embodiment, and the illustration and explanation are partly omitted.

A teletext signal receiving circuit is identified with reference numeral 3224a. The internal structure of the teletext signal receiving circuit 3224a is similar to the teletext signal receiving circuit 824a in FIG. 26 relating to the ninth embodiment, and it comprises two VRAMs 2633a, 2633b, and a line memory 2635a with a double capacity. It is same as in the tenth embodiment that the vertical position moving circuit 3241 is added, which moves the television video signal from the video chroma signal processing circuit 3223 to the upper side in the vertical direction, and sends out to the switch 3226. This vertical position moving circuit 3241 is provided with a field memory 2842 which operates as shown in FIG. 29.

By the control of the vertical position moving circuit 3241, as shown in FIG. 33 and FIG. 34, the television video signal 3343 moves to the upper side in the vertical direction, same as in the tenth embodiment. The no-picture area in the lower screen portion is divided into left and right sides, and the teletext signals sent out from the VRAMs 2633a, 2633b are individually displayed in the corresponding left screen portion 3338b₁ and right screen portion 3338b₂ in vertical scroll state. The direction of the vertical scroll may be either upward or downward.

In this way, according to the embodiments of the invention, when displaying teletext signal simultaneously with the television video signal on the picture screen by superimposing or dividing the screen, various preprocessing is done for explicit display of teletext signal, and the object is achieved by adding a correction signal for clarifying the boundary.

As evident from the foregoing embodiments, according to the television receiver for teletext of the invention, in the display region of teletext signal of the picture screen, the background color around the foreground color of the text is half in luminance (opaque color), and a video chroma signal of opaque color is displayed behind, so that the text is easy to see. When the foreground color is fixed in color variety to display fixed foreground color, especially white, the text is easier to see. When scrolling the text vertically, the vertical width of the display region of the teletext signal may be small, and the text of vertical scroll is easy to see. In the foregoing embodiments, the display position of the teletext signal displayed in vertical scroll state is at the lower side of the screen, but, to the contrary, it may be designed to display at the upper side.

Moreover, according to the television receiver for teletext of the invention, since a dark trimming is formed around the displayed superimposed text, the text may be displayed in an easy-to-read state if the text and television picture are close at the same luminance level.

In particular, when the dark trimming is formed at the right and left side of the text, the text may be displayed in a clearer state.

Still more, according to the television receiver for teletext of the invention, since the teletext signal is displayed in a narrow strip at the lower side, or upper side of the screen, so that the television video signal may be displayed in a wide, easy-to-see state, and the teletext signal is displayed without forming no-picture area, so that the full screen can be utilized effectively, and although the display area of teletext signal is small, it is scrolled vertically, and hence there is no problem for viewing the teletext signals. It is particularly useful in the picture tube of which aspect ratio is 16:9.

The teletext display technique of the invention is applied not only to teletext, but also to other information processing applications by superimposing information of other network on the television screen such as the Internet.

What is claimed is:

1. A television receiver for teletext comprising:

a video chroma signal processing circuit for demodulating a composite video signal into a video chroma signal, a teletext signal receiving circuit for extracting a teletext signal superposed in the composite video signal, determining if said teletext signal is character data or graphics data, and providing a foreground color or a background color based on whether said teletext signal is character data or graphics data; and a switch for displaying the video chroma signal from the video chroma signal processing circuit and the teletext signal from the teletext signal receiving circuit simultaneously on a picture screen, wherein, if said teletext signal is character data, said foreground color is reset to a fixed color and said background color is reset to a YM color.

2. A television receiver for teletext comprising:

a video chroma signal processing circuit for demodulating a composite video signal into a video chroma signal, a teletext signal receiving circuit for extracting a teletext signal superposed in the composite video signal, determining if said teletext signal is character data or graphics data, and providing a foreground color or a background color based on whether said teletext signal is character data or graphics data; and a switch for displaying the video chroma signal from the video chroma signal processing circuit and the teletext signal from the teletext signal receiving circuit simultaneously on a picture screen, wherein, if said teletext signal is graphics data and said background color is transparent, said background color is reset to a YM color.

* * * * *

UNITED STATES PATENT AND TRADEMARK OFFICE
CERTIFICATE OF CORRECTION

PATENT NO.    : 6,532,041 B1                                                Page 1 of 1
DATED         : March 11, 2003
INVENTOR(S)   : Monta et al.

It is certified that error appears in the above-identified patent and that said Letters Patent is hereby corrected as shown below:

<u>Title page,</u>
Item [57], ABSTRACT,
Delete in its entirety and insert:

-- A television receiver receives a composite video signal having teletext information superposed on a television video signal, and displays the television video signal and teletext information simultaneously on the picture screen by superimposing or dividing the screen. The television receiver comprises a preprocessor for issuing various preprocessing correction signals on the basis of the teletext signal extracted by a teletext signal receiver. The preprocessing correction signal issued by the preprocessor, and the teletext signal received by the teletext signal receiver are combined and displayed on the picture screen, and thereby the boundary of the television video signal and teletext signal is more defined, so that the teletext is easier to read. --

Signed and Sealed this

Fourth Day of November, 2003

JAMES E. ROGAN
*Director of the United States Patent and Trademark Office*